US011654998B2

(12) United States Patent
Dunlap, III

(10) Patent No.: US 11,654,998 B2
(45) Date of Patent: May 23, 2023

(54) FRONT FORKS FOR BICYCLES

(71) Applicant: SRAM, LLC, Chicago, IL (US)

(72) Inventor: Charles Dunlap, III, Manitou Springs, CO (US)

(73) Assignee: SRAM, LLC, Chicago, IL (US)

(*) Notice: Subject to any disclaimer, the term of this patent is extended or adjusted under 35 U.S.C. 154(b) by 0 days.

(21) Appl. No.: 17/315,666

(22) Filed: May 10, 2021

(65) Prior Publication Data
US 2022/0355894 A1 Nov. 10, 2022

(51) Int. Cl.
B62K 25/18 (2006.01)
B62K 25/22 (2006.01)
B62K 25/24 (2006.01)

(52) U.S. Cl.
CPC .................. B62K 25/18 (2013.01)

(58) Field of Classification Search
CPC ........ B62K 25/18; B62K 25/24; B62K 25/22; B60G 3/18
USPC ........................................................ 280/276
See application file for complete search history.

(56) References Cited

U.S. PATENT DOCUMENTS

| 913,961 | A | * | 3/1909 | Levedahl | B62K 25/24 |
| | | | | | 280/276 |
| 4,627,632 | A | * | 12/1986 | McKagen | B62K 25/24 |
| | | | | | 280/286 |
| 4,971,344 | A | | 11/1990 | Turner | |
| 5,299,820 | A | * | 4/1994 | Lawwill | B62K 25/24 |
| | | | | | 280/277 |
| 5,431,426 | A | * | 7/1995 | Ijams | B62K 25/24 |
| | | | | | 280/277 |
| 5,441,291 | A | * | 8/1995 | Girvin, III | B62K 25/24 |
| | | | | | 267/293 |
| 5,743,547 | A | * | 4/1998 | Voss | B62K 25/08 |
| | | | | | 280/277 |
| 5,749,590 | A | * | 5/1998 | Roerig | B62K 25/24 |
| | | | | | 280/276 |
| 6,109,634 | A | * | 8/2000 | Moulton | B62K 21/20 |
| | | | | | 280/276 |

(Continued)

FOREIGN PATENT DOCUMENTS

| DE | 687446 | C | * | 1/1940 |
| DE | 705757 | C | * | 8/1941 |

(Continued)

OTHER PUBLICATIONS

FR-837373-A English Translation of Description Espacenet—Retrieved Feb. 9, 2022.*

(Continued)

Primary Examiner — Minnah L Seoh
Assistant Examiner — Myles A Harris

(57) ABSTRACT

Front forks for bicycles are described herein. An example front fork includes an upper fork including a first leg and a second leg, a lower fork including a third leg disposed along the first leg and a fourth leg disposed along the second leg, a first set of links rotatably coupled between the first leg and the third leg, and a second set of links rotatably coupled between the second leg and the fourth leg. The first and second sets of links enable the lower fork to swing relative to the upper fork. The front fork also includes a steerer tube coupled to the front fork and a spring in the steerer tube. The spring is configured to bias the lower fork away from the steer tube.

17 Claims, 11 Drawing Sheets

(56) References Cited

U.S. PATENT DOCUMENTS

| | | | |
|---|---|---|---|
| 6,517,095 B1* | 2/2003 | Lansac | B62K 25/24 |
| | | | 280/279 |
| 6,607,185 B2 | 8/2003 | Graves et al. | |
| 6,783,140 B1* | 8/2004 | Huang | B62K 25/24 |
| | | | 280/276 |
| 9,375,989 B2 | 6/2016 | Skulason | |
| 10,196,106 B1 | 2/2019 | Weagle | |
| 2001/0026058 A1* | 10/2001 | Ito | B62K 25/24 |
| | | | 280/276 |
| 2019/0061865 A1* | 2/2019 | Weagle | B62K 25/24 |
| 2020/0115001 A1* | 4/2020 | Weagle | B62K 25/24 |

FOREIGN PATENT DOCUMENTS

| | | | | |
|---|---|---|---|---|
| DE | 9005142 U1 | * | 5/1990 | |
| DE | 202014005311 | | 11/2015 | |
| EP | 1270391 A2 | * | 1/2003 | B62K 25/24 |
| FR | 463930 A | * | 7/1914 | |
| FR | 837373 A | * | 8/1939 | |
| FR | 1078124 A | * | 11/1954 | |
| GB | 167880 A | * | 8/1921 | |
| GB | 471472 A | * | 6/1937 | |
| GB | 2334699 A | * | 9/1999 | B62K 21/20 |
| KR | 101445667 B1 | * | 10/2014 | |
| WO | WO-9746443 A1 | * | 12/1997 | B62K 25/24 |
| WO | 2012009795 | | 1/2012 | |

OTHER PUBLICATIONS

EP-1270391-A2 English Translation of Description Espacenet—Retrieved Feb. 9, 2022.*
Mombat, 1991 Fisher RS-1, mombatbicycles.com/MOMBAT/Bikes. 1991_Fisher_RS1.html, Last Checked Aug. 18, 2022.
STUMPJUMPER 1990, PROFLEX 855 Frameset Incl. Girvin vector 20—SOLD', https://www.retrobike.co.uk/threads/proflex-855-frameset-incl-girvin-vector-20-sold.234136/, Last Checked Aug. 18, 2022.

* cited by examiner

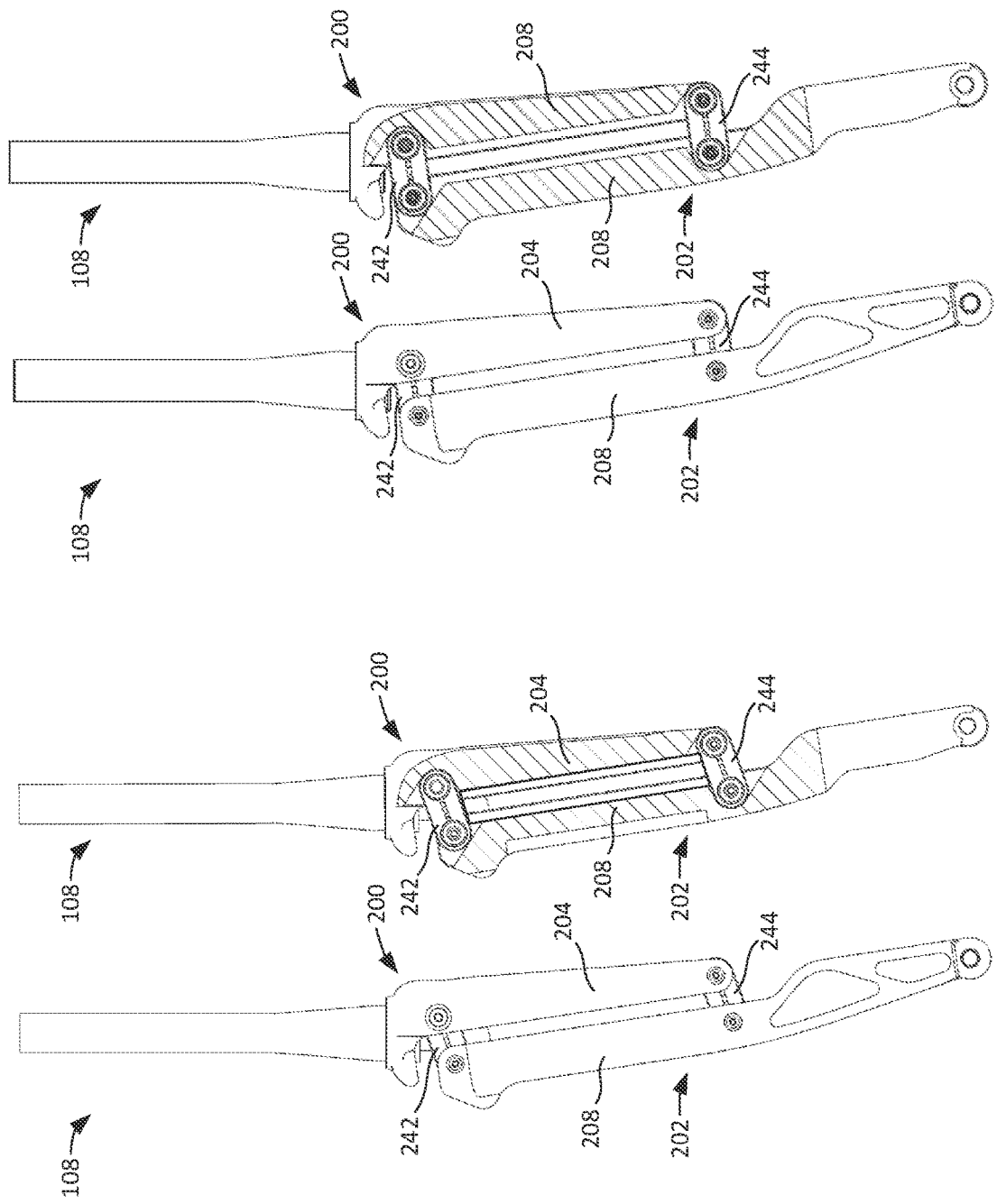

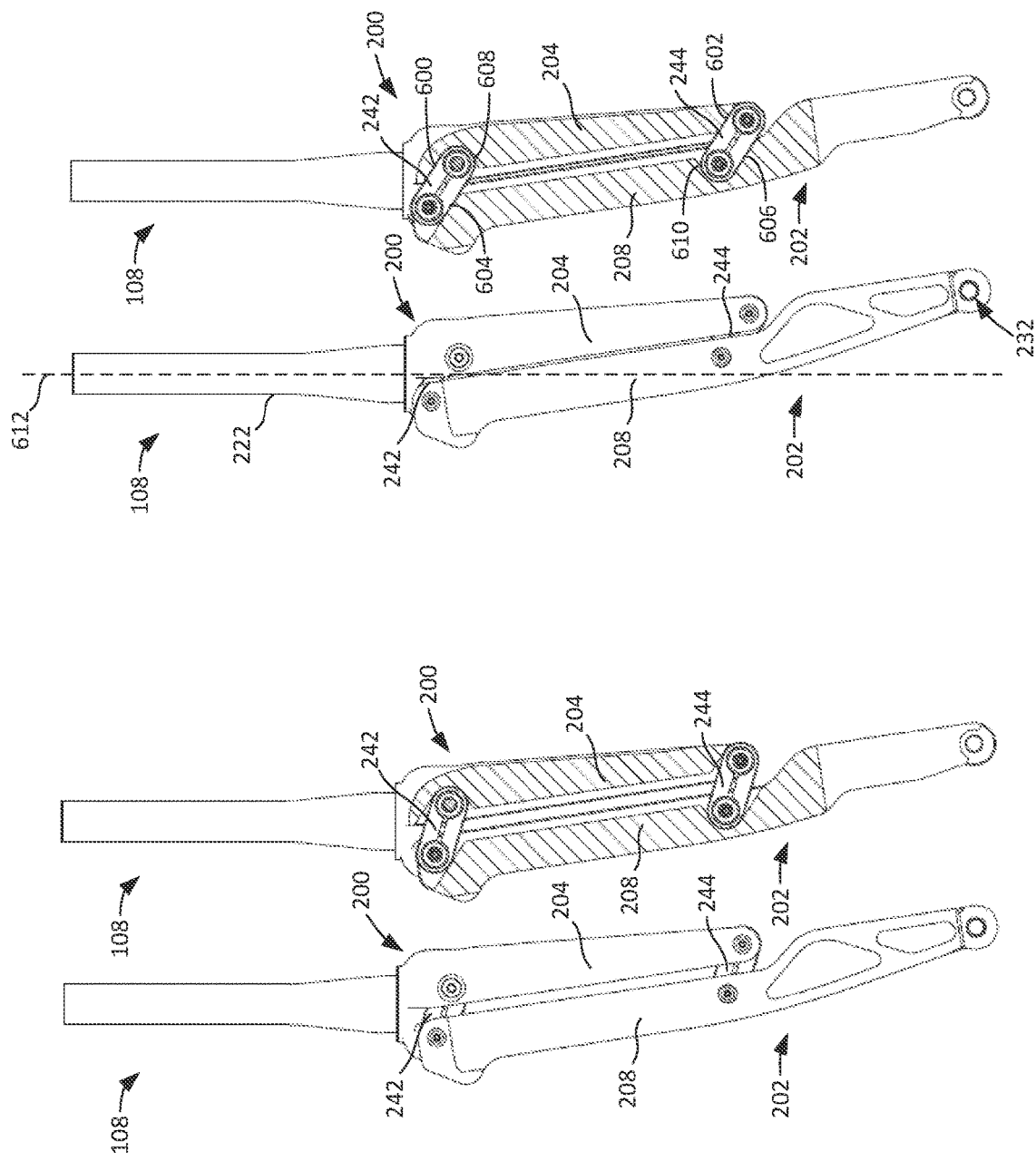

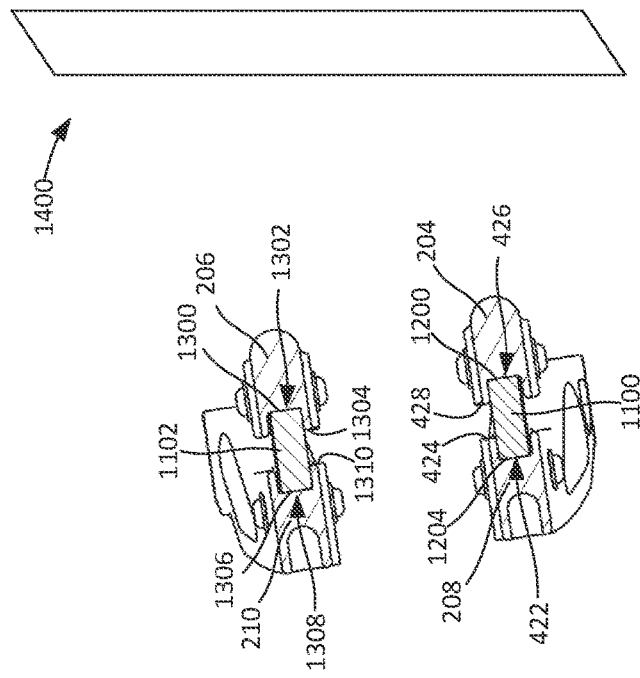
FIG. 14
FIG. 13
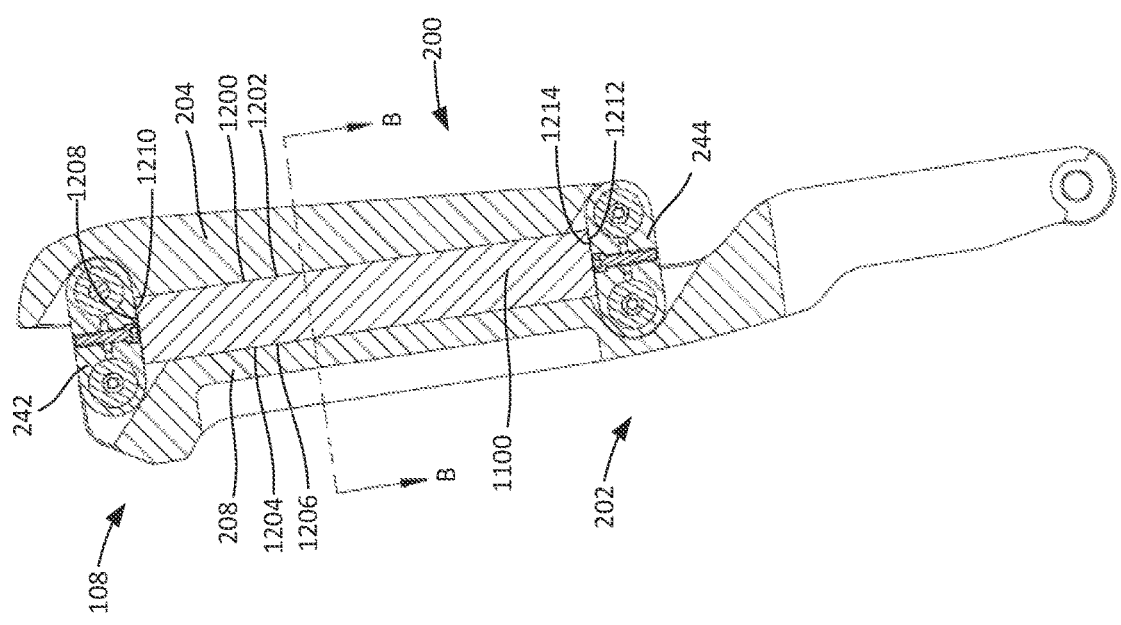
FIG. 12

FRONT FORKS FOR BICYCLES

FIELD OF THE DISCLOSURE

This disclosure relates generally to bicycle components and, more specifically, to front forks for bicycles.

BACKGROUND

Bicycles are known to have front forks that operate as suspension components. The front fork connects the front wheel to the frame of the bicycle. The front fork can compress and expand to reduce or dampen impacts or vibrations experienced by the rider when the bicycle is ridden over bumps, ruts, rocks, pot holes, and/or other obstacles.

SUMMARY

An example front fork for a bicycle disclosed herein includes an upper fork including a first leg and a second leg, a lower fork including a third leg disposed along the first leg and a fourth leg disposed along the second leg, a first set of links rotatably coupled between the first leg and the third leg, and a second set of links rotatably coupled between the second leg and the fourth leg. The first and second sets of links enable the lower fork to swing relative to the upper fork. The front fork also includes a steerer tube coupled to the front fork and a spring in the steerer tube. The spring is configured to bias the lower fork away from the steer tube.

Another example front fork for a bicycle disclosed herein includes an upper fork including a first leg and a second leg and a lower fork including a third leg disposed along the first leg and a fourth leg disposed along the second leg. The lower fork is moveably coupled to the upper fork. The front fork also includes a first shear spring disposed between the first leg and the third leg and a second shear spring disposed between the second leg and the fourth leg. The first and second shear springs are configured to bias the lower fork away from the upper fork.

BRIEF DESCRIPTION OF THE DRAWINGS

FIGS. 6A-6D show side views and corresponding cross-sectionals views of the example front fork of FIG. 2 in different positions or states.

FIG. 12 is a cross-sectional view of the example front fork and one of the example shear springs of FIG. 11.

FIG. 13 is a cross-sectional view of the example front fork and the example shear springs of FIG. 11 taken along line B-B of FIG. 12.

FIG. 14 is a side view of an example shear spring having a parallelogram shape that can be implemented in the example front fork of FIG. 11.

The figures are not to scale. Instead, the thickness of the layers or regions may be enlarged in the drawings. In general, the same reference numbers will be used throughout the drawing(s) and accompanying written description to refer to the same or like parts.

Figure 1:
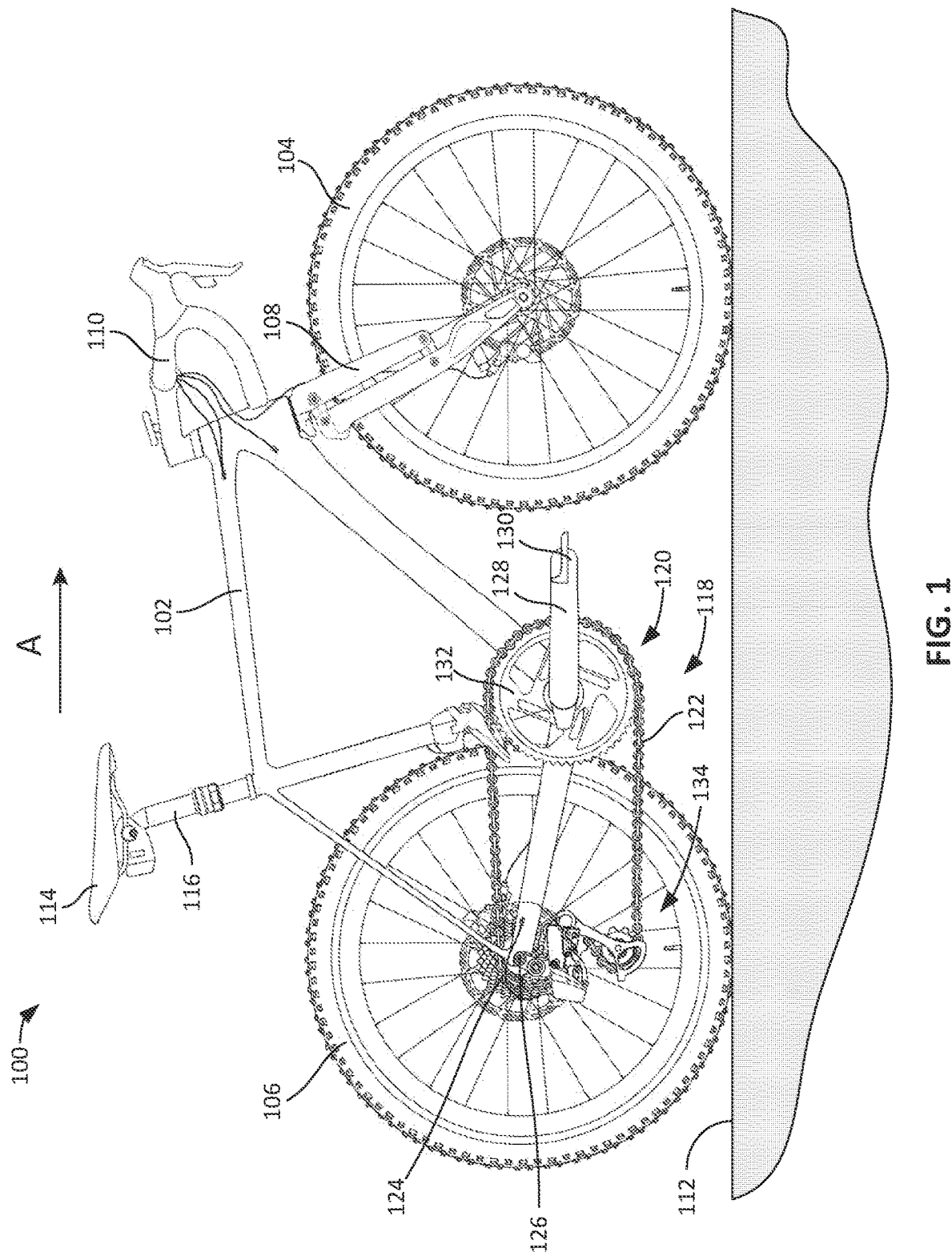
FIG. 1 is a side view of an example bicycle that can employ the example front forks disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Known front forks on bicycles are often configured as telescoping tube forks. These telescoping tube forks include first and second upper leg tubes that are telescopically arranged with respective first and second lower leg tubes. The first and second upper leg tubes are coupled to a steerer tube, and the first and second lower leg tubes are coupled to the axle of the front wheel. In these known telescoping tube forks, one leg incorporates a spring and the other leg incorporates a damper. The spring and/or the damper are often hydraulic and require multiple sealed chambers. As such, these known telescoping tube forks are often expensive and complex to manufacture.

Also, these known telescoping tube forks are often designed for large ranges of travel, such as 100-200 millimeters (mm). Therefore, these known telescoping tube forks are not optimal for some bicycles such as road or hybrid bicycles where only small amount of suspension travel may be desired. In general, larger suspension systems result in lost power from pedaling because the front fork compresses during pedaling. Further, in these known telescoping tube forks, the spring and the damper require a certain breakaway force before the upper and lower leg tubes begin to move relative to each other. With bicycles ridden mainly on the road, for example, this amount of force may not be met and, thus, smaller bumps and vibrations (e.g., from gravel) are transmitted through the bicycle to the rider. Moreover, the telescoping motion of multiple, linear moving structural members requires extra overlapping length and, therefore, the leg tubes must remain parallel at a width greater than the hub. This is a disadvantage in that the leg tubes cannot be any narrower than the widest part of the wheel, thereby increasing the visual width and aerodynamic drag of the bicycle.

Other known fork designs include flexing members or linkage type of forks. These known types of forks have a separate lower member on each side of the front wheel, and therefore are not structurally connected. Separate lower members allow for excessive independent movement of the lower members relative to each other. In use, when side loading due cornering or bumps occurs, the lower members move relative to each other leading to the wheel position and/or suspension trajectory moving out of center plane of the bicycle, which results in imprecise steering behavior.

Disclosed herein are example front forks that address at least some of the above-noted draw-backs of traditional telescoping tube forks and flexing member or linkage type forks. An example front fork disclosed herein includes an upper fork member or portion, referred to herein as an upper fork, and a lower fork member or portion, referred to herein as a lower fork. The upper fork includes a first leg and a second leg that are coupled by a crown (which is coupled to a steerer tube). The lower fork includes a third leg and a fourth leg that are to be coupled to the axle of the front wheel. The third leg of the lower fork is disposed along the first leg of the upper fork, and the fourth leg of the lower fork is disposed along the second leg of the upper fork. The lower fork is movable relative to the upper fork. For example, the lower fork can move in a substantially upward or downward direction relative to the upper fork. Therefore, if the front wheel rides over bumps or obstacles, the lower fork (and the wheel) can move relative to the upper fork to absorb at least some of the shocks or vibrations.

In some examples disclosed herein, the upper and lower forks are movably coupled by a linkage assembly including one or more links. In some examples, a first set of links (e.g., a pair of links) is rotatably coupled between the first and third legs. The links may be rotatably coupled to the first and third legs via rotation facilitation elements such as bearings or bushings. The links are spaced apart from each other. For example, a first link can be disposed near the top end of the upper fork and a second link can be disposed near a bottom end of the upper fork. The first set of links enables the third leg to move in a non-linear motion, such as a swinging or arching motion, upward or downward relative to the first leg. Similarly, in some examples, a second set of links (e.g., a pair of links) is rotatably coupled between the second and fourth legs. Thus, in some examples, the front fork includes two sets of links that are symmetrical about a center plane. The links enable the lower fork to move (e.g., swing) upward or downward relative to the upper fork, which enables the lower fork (and, thus, the wheel) to move relative to the upper fork and the frame. The upper and lower forks are movable between a top-out or uncompressed position and a bottom-out or compressed position. In some examples, this linkage configuration has a lower breakaway force compared to known telescoping tube forks, which enables the front fork to respond more quickly to shocks and vibrations than known forks. Thus, the example front forks disclosed herein may be more useful in lower vibration applications such as on road or hybrid bicycles.

In some examples, the lower fork is a single-piece structure that includes the third leg, the fourth leg, and a bridge coupled between the top ends of the third and fourth legs. For example, the third leg and the fourth leg can be coupled (e.g., bolted) to each other at the bridge or coupled to opposite sides of the bridge, such that the third leg, the fourth leg, and the bridge form a single moving structure. In other examples, the third leg, the fourth leg, and the bridge can be constructed as single monolithic structure (e.g., cast as a single part). When the front fork is installed on a bicycle, the bridge extends over the front wheel. Thus, the lower fork forms a continuous structure that is coupled to one end of the axle on one side of the front wheel and coupled to the other end of the axle on the other side of the front wheel. In some examples, using a single-piece structure for the lower fork reduces deflections of the front wheel relative to the center plane as seen in known flexing linkage type forks.

In some examples disclosed herein, the third and fourth legs of the lower fork are bowed or curved inward of the hub width. In particular, because the example front fork does not use telescoping tubes, portions of the upper and lower forks can be positioned closer to the front wheel. This reduces aerodynamic drag and results in a more streamlined appearance compared to known telescoping tube forks.

In some examples, the front forks disclosed herein include one or more spring(s). The spring(s) are used to absorb shocks and vibrations as well as return the front fork to the unloaded or expanded position after a dynamic compression movement. In some examples disclosed herein, the front fork includes a spring that is at least partially disposed in the steerer tube. In some examples, the spring is a cylindrical or tubular member constructed of a compliant material (e.g., urethane, a thermoplastic, etc.). In some example, the spring is installed in the steerer tube such that one end of the spring is disposed in and coupled to the steerer tube, and the opposite end of the spring extends outward from a bottom end of the steerer tube and is engaged with the bridge of the lower fork. During a dynamic compression movement, the lower fork is moved upward (toward the steerer tube) relative to the upper fork. As a result, the spring is compressed, which dampens the movement and helps absorb shocks and vibrations. When the compressive load on the front fork is released, the spring expands to move the lower fork downward (away from the steerer tube) back to the uncompressed position. In some examples, the spring rate is defined by flexing links. While in some examples the spring is implemented as a cylindrical member of compliant material, in other examples, the spring can be implemented another type of spring, such as a coil spring or a gas spring (e.g., an air spring).

In another example disclosed herein, the front fork includes first and second shear springs. The first and second shear springs may be blocks (e.g., cuboid shaped blocks) of compliant material. In some examples, the first shear spring is disposed between and in contact with the first and third legs and the links that couple the first and third legs. Similarly, the second shear spring is disposed between and in contact with the second and fourth legs and the links that couple the second and fourth legs. When front fork is compressed and the lower fork moves upward relative to the upper fork, the first and second shear springs undergo a shearing and compression action. This shearing and compression actions helps absorb shocks and vibrations. Further, when the compressive load on the front fork is released, a counter-shearing and expanding force provided by the first and second shear springs pushes the lower fork in the downward direction and away from the upper fork to expand the front fork back to the uncompressed position. In some examples disclosed herein, the front fork can include both the spring in the steerer tube and the first and second shear springs. In other examples, the springs can be utilized separately. Additionally or alternatively, other types of springs can be implemented and can be incorporated in other manners. In some examples, the front fork can include a mechanism within the spring system and/or between the upper fork and the lower fork to lock the spring(s) and/or alter the spring rate(s).

In some of these examples, the position(s) of the spring(s) add support to further improve center plane wheel deflections. Further, in some examples, the springs are incorporated in a manner in which they reduce or do not add additional aerodynamic drag to the bicycle or obstruct the streamlined appearance of the bicycle. The example front forks disclosed herein are less expensive and laborious to manufacture compared to known telescoping tube forks that include complex hydraulic systems. Further, the example front forks disclosed herein can be configured for various travel ranges, such as medium or lower travel ranges (e.g., 30-60 mm), which is optimal for road and hybrid bicycles, but can also be configured for larger travel ranges such as those desired for mountain bicycles.

Turning now to the figures, FIG. 1 illustrates one example of a human powered vehicle on which the example front forks disclosed herein can be implemented. In this example, the vehicle is one possible type of bicycle 100, such as a road bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via an example front fork 108 (which may also be referred to as a fork). Examples of the front fork 108 are disclosed in further detail herein. The bicycle 100 also includes handlebars 110 (e.g., near a forward end of the frame 102 relative to a forward direction A) for steering the bicycle 100. The handlebars 110 are coupled to a steerer tube of the front fork 108 that extends through the frame 102. The bicycle 100 is shown on a riding surface 112. The riding surface 112 may be any riding surface such as the ground (e.g., a dirt path, a sidewalk, a street, etc.), a man-made structure above the ground (e.g., a wooden ramp), and/or any other surface. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 114 coupled to the frame 102 (e.g., near the rear end of the frame 102 relative to the forward direction A) via a seat post 116. In the illustrated example, the bicycle 100 has a drivetrain 118 that includes a crank assembly 120. The crank assembly 120 is operatively coupled via a chain 122 to a sprocket assembly 124 mounted to a hub 126 of the rear wheel 106. The crank assembly 120 includes at least one, and typically two, crank arms 128 and pedals 130, along with at least one front sprocket, or chainring 132. A rear gear change device 134, such as a derailleur, is disposed at the rear wheel 106 to move the chain 122 through different sprockets of the sprocket assembly 124. Additionally or alternatively, the bicycle 100 may include a front gear change device to move the chain 122 through gears on the chainring 132.

The example bicycle 100 includes a suspension system having one or more suspension components. In this example, the front fork 108 is implemented as a front suspension component. The front fork 108 can absorb shocks and vibrations while riding the bicycle 100 (e.g., when riding over rough terrain), which lessens the impacts felt by the rider. In some examples, the bicycle 100 can include a rear suspension component, such as a rear shock absorber. Additionally or alternatively, the bicycle 100 can include one or more additional suspension components, such as a suspension component on the seat post 116.

While the example bicycle 100 depicted in FIG. 1 is a type of road bicycle, the example front forks disclosed herein can be implemented on other types of bicycles. For example, the disclosed front forks may be used on mountain bicycles, as well as bicycles with mechanical (e.g., cable, hydraulic, pneumatic, etc.) and non-mechanical (e.g., wired, wireless) drive systems. The disclosed front forks may also be implemented on other types of two-wheeled, three-wheeled, and four-wheeled human powered vehicles. Further, the example front forks can be used on other types of vehicles, such as motorized vehicles (e.g., a motorcycle, a car, a truck, etc.).

Figure 3:
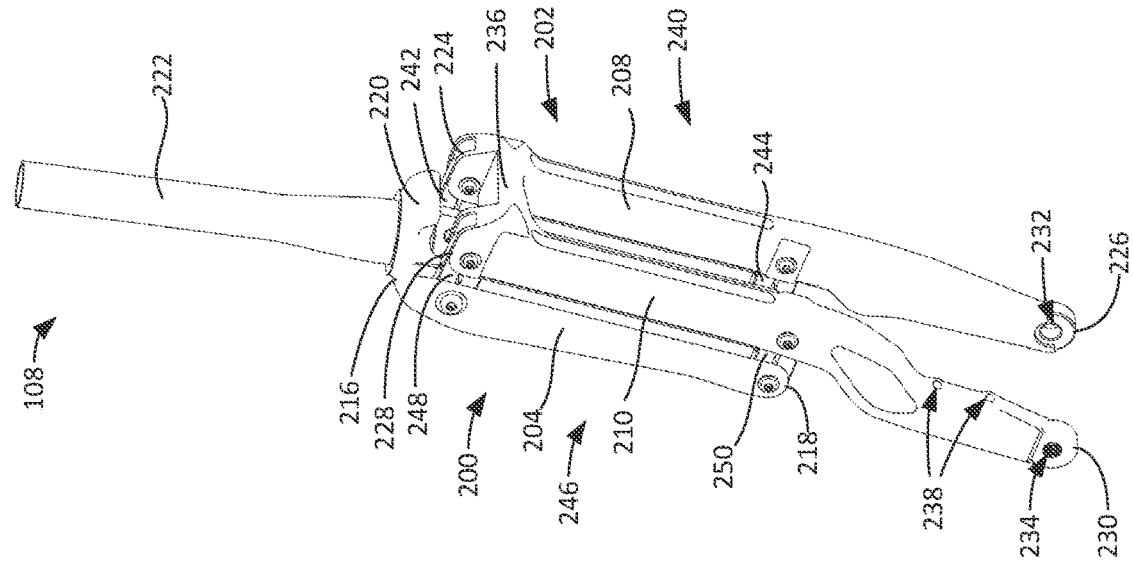
FIG. 3 is a rear perspective view of the example front fork of FIG. 2.
Figure 2:
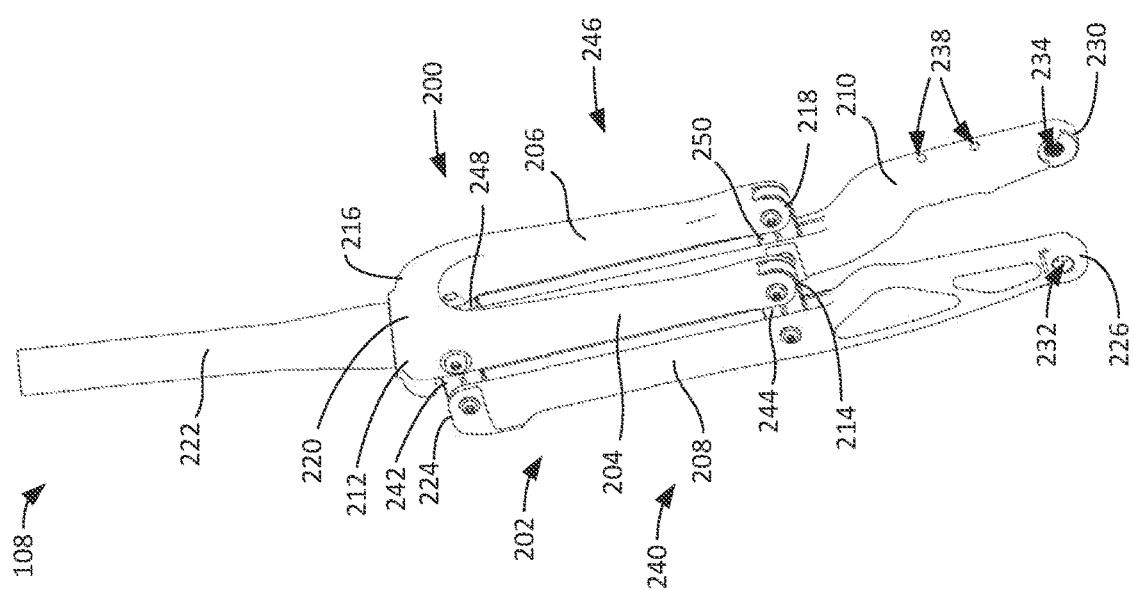
FIG. 2 is a front perspective view of an example front fork that can be implemented on the example bicycle of FIG. 1.

FIGS. 2 and 3 are front and rear perspective views, respectively, of the example front fork 108 that can be implemented on the bicycle 100 of FIG. 1. The front fork 108 can be considered a suspension component that helps absorbs shock and vibrations. In the illustrated example of FIGS. 2 and 3, the front fork 108 includes an upper fork 200 and a lower fork 202, which may also be referred to as an upper or upper member and a lower or lower member, respectively. The upper and lower forks 200, 202 are movable (e.g., in a swinging motion) relative to each other, which enables the front fork 108 to absorb shocks and vibrations, as disclosed in further detail herein. In this example, the lower fork 202 is rearward of the upper fork 200 (relative to the forward direction A of FIG. 1). This type of configuration may be referred to as a trailing link front fork. In some examples, this type of configuration is more aerodynamic than having the lower fork 202 forward of the upper fork 200. However, in other examples, the front fork 108 can be configured where the lower fork 202 is forward of the upper fork 200.

In the illustrated example of FIGS. 2 and 3, the upper fork 200 includes a first leg 204 and a second leg 206 (only labeled in FIG. 2) that is parallel to and spaced apart from the first leg 204. The lower fork 202 includes a third leg 208 and a fourth leg 210 that is parallel to and spaced apart from the third leg 208. In the illustrated example, the third leg 208 of the lower fork 202 is disposed along (e.g., adjacent and parallel to) the first leg 204 of the upper fork 200, and the fourth leg 210 of the lower fork 202 is disposed along (e.g., adjacent and parallel to) the second leg 206 of the upper fork 200. When the front fork 108 is installed on the bicycle 100 (FIG. 1), the first and third legs 204, 208 are disposed on the right side of the front wheel 104 (from the perspective of the rider), and the second and fourth legs 206, 210 are disposed on the left side of the front wheel 104 (from the perspective of the rider).

As shown in FIG. 2, the first leg 204 has a top end 212 and a bottom end 214 opposite the top end 212. Similarly, as shown in FIGS. 2 and 3, the second leg 206 has a top end 216 and a bottom end 218 opposite the top end 216. In the illustrated example, the upper fork 200 includes a crown 220 that couples the top ends 212, 216 of the first and second legs 204, 206. In some examples, the upper fork 200, including the first leg 204, the second leg 206, and the crown 220, is constructed as single unitary part or component (e.g., a monolithic structure). In other examples, the first leg 204, the second leg 206, and/or the crown 220 can be constructed of three (or more) separate parts or components that are coupled together (e.g., via welding, bonding, threaded fasteners, etc.).

In the illustrated example of FIGS. 2 and 3, the front fork 108 includes a steerer tube 222 (sometimes referred to as a steering tube or steerer). The steerer tube 222 is coupled to the upper fork 200. In particular, in this example, the steerer tube 222 is coupled to and extends upward from the crown 220 of the upper fork 200. The steerer tube 222 is to be rigidly coupled to the upper fork 200. In some examples, the steerer tube 222 is integral with the upper fork 200. For example, the steerer tube 222 and the upper fork 200 can be constructed of a single unitary part or component (e.g., a monolithic structure). In other examples, the steerer tube 222 can be a separate part that is coupled to the upper fork 200 (e.g., via welding, bonding, threaded fasteners, etc.). In some examples, the steerer tube 222 and the upper fork 200 are constructed of an alloy and/or carbon fiber. In other examples, the steerer tube 222 and the upper fork 200 can be constructed of other materials (e.g., aluminum, stainless steel, etc.). The steerer tube 222 extends through a head tube on the frame 102 (FIG. 1) of the bicycle 100 (FIG. 1). The handlebars 110 (FIG. 1) are coupled (e.g., directly or via a stem) to the steerer tube 222. When a rider turns the handlebars 110, the motion rotates the steerer tube 222, which rotates the upper fork 200 and, thus, rotates the lower fork 202 to rotate the front wheel 104 (FIG. 1).

While in this example the front fork 108 includes only one steerer tube 222, in other examples, the front fork 108 can include multiple (e.g., dual) steerer tubes. For example, two steerer tubes can be coupled to the crown 220. The steerer tubes may be offset from the center plane of the front wheel 104. In other examples, the steerer tube 222 can be implemented as a non-tubular structural member, which can extend inside and/or outside of the head tube on the frame 102 (FIG. 1). In the illustrated example, the steerer tube 222 has a tapered profile, such that the steerer tube 222 has a larger diameter at the connection with the crown 220. This enlarged section may be provided for added structural integrity at the connection with the crown 220. However, in other examples, the steerer tube 222 may not have a tapered profile, or may have a different shaped tapered profile.

In the illustrated example of FIGS. 2 and 3, the third leg 208 has a top end 224 and a bottom end 226 opposite the top end 224. Similarly, the fourth leg 210 has a top end 228 (only labeled in FIG. 3) and a bottom end 230 opposite the top end 228. The third and fourth legs 208, 210 have respective attachment portions 232, 234, such as holes (e.g., eyelets) or dropouts, for attaching the axle of the front wheel 104 (FIG. 1) to the lower fork 202. In the illustrated example, the lower fork 202 includes a bridge 236 (FIG. 3) extending between the third and fourth legs 208, 210. In particular, in this example, the bridge 236 is coupled between the third leg 208 and the fourth leg 210 near the top ends 224, 228. Therefore, in this example, the lower fork 202 may be considered a one- or single-piece fork member. When the front fork 108 is installed on the bicycle 100 (FIG. 1), the third leg 208 is on the right side of the front wheel 104 (FIG. 1), the fourth leg 204 is on the left side of the front wheel 104, and the bridge 236 extends over the front wheel 104 between the third and fourth legs 208, 210, from the perspective of the rider. This continuous structure extends from one end of the axle at the attachment portion 232 of the third leg 208 to the opposite end of the axle at the attachment portion 234 of the fourth leg 210 to provide adequate stiffness and precise steering. In some examples, this single-piece design results in less wheel deflections relative to a center plane of the bicycle 100 compared to known flexing member fork configurations having two separate pieces. In some examples, the lower fork 202, including the third leg 208, the fourth leg 210, and the bridge 236, is constructed as single unitary part or component (e.g., a monolithic structure). In other examples, the third leg 208, the fourth leg 210, and/or the bridge 236 can be constructed of three (or more) separate parts or components that are coupled together (e.g., via welding, bonding, threaded fasteners, etc.). In some examples, the lower fork 202 is constructed of an alloy and/or carbon fiber.

In other examples, the lower fork 202 can be constructed of other materials (e.g., aluminum, stainless steel, etc.).

In some examples, the bicycle 100 (FIG. 1) can include a front disc brake. In such an example, a front brake caliper can be coupled to one of the third or fourth legs 208, 210 to be located near the corresponding disc. For example, as shown in FIGS. 2 and 3, the fourth leg 210 has holes 238 that can receive threaded fasteners (e.g., bolts) for mounting the front brake caliper to the fourth leg 210. In other examples, a brake can be coupled to another portion of the lower fork 202. For example, a rim brake can be coupled to the bridge 236.

To moveably couple the upper fork 200 and the lower fork 202, the example front fork 108 includes a linkage assembly or system including one or more links (which may also be referred to as linkages or articulating members). For example, as shown in FIGS. 2 and 3, the front fork 108 includes a first set of links 240 rotatably coupled between the first leg 204 and the third leg 208. In this example, the first set of links 240 includes a first link 242 and a second link 244. The first and second links 242, 244 are rotatably coupled to the first and third legs 204, 208. For example, one end or portion of the first link 242 is rotatably coupled to the first leg 204 and the opposite end or portion of the first link 242 is rotatably coupled to the third leg 208. Similarly, one end or portion of the second link 244 is rotatably coupled to the first leg 204 and the opposite end or portion of the second link 244 is rotatably coupled to the third leg 208. In some examples, the first and second links 242, 244 are rotatably coupled to the first and third legs 204, 208 via bearings, disclosed in further detail herein. As shown in FIGS. 2 and 3, the first and second links 242, 244 are spaced apart from each other. In this example, the first link 242 is rotatably coupled to the first leg 204 at or near the top end 212 of the first leg 204, and the first link 242 is rotatably coupled to the third leg 208 at or near the top end 224 of the third leg 208. The second link 244 is rotatably coupled to the first leg 204 at or near the bottom end 214 of the first leg 204, and the second link 244 is rotatably coupled to the third leg 208 near a middle of the third leg 208 between the top and bottom ends 224, 226 of the third leg 208. In other examples, the first set of links 240 can include more or fewer links to couple the first and third legs 204, 208. Further, the link(s) can be coupled to the first and third legs 204, 208 in other locations.

In the illustrated example of FIGS. 2 and 3, the front fork 108 also includes a second set of links 246 rotatably coupled between the second leg 206 and the fourth leg 210. In this example, the second set of links 246 includes a third link 248 and a fourth link 250. Thus, the links 242, 244, 248, 250 are mounted symmetrically about a central plane of the front wheel 104 (FIG. 1). The third and fourth links 248, 250 are the same as the first and second links 242, 244 and are rotatably coupled to the second and fourth legs 206, 210 in the same manner and locations as the first and second links 242, 244 relative to the first and third legs 204, 208. Thus, to avoid redundancy, a description of the third and fourth links 248, 250 and their locations is not repeated.

The first and second sets of links 240, 246 enable the lower fork 202 to move relative to the upper fork 200. In particular, in this configuration, the first and second sets of links 240, 246 enable the lower fork 20 to swing relative to the upper fork 200, which enables the lower fork 202 to move in an upward direction relative to the upper fork 200. Therefore, if the front wheel 104 (FIG. 1) rides over a bump or obstacle, the front wheel 104 and the lower fork 202 can swing upward relative to the upper fork 200, which reduces shocks and vibrations that are transmitted to the upper fork 200 and to the rider.

In some examples, the links 242, 244, 248, 250 are constructed of aluminum. In other examples, the links 242, 244, 248, 250 can be constructed of another material (e.g., stainless steel). In the illustrated example, all of the links 242, 244, 248, 250 are the same length. However, in other examples, the first and third links 242, 248 and the second and fourth links 244, 250 could be different lengths. While in this example each of the upper and lower forks 200, 202 each has two legs and links on each side of the center plane of the front wheel 104 (FIG. 1), in other examples, the upper and lower forks 200, 202 may only have legs and links on one side of the front wheel 104.

Figure 4:
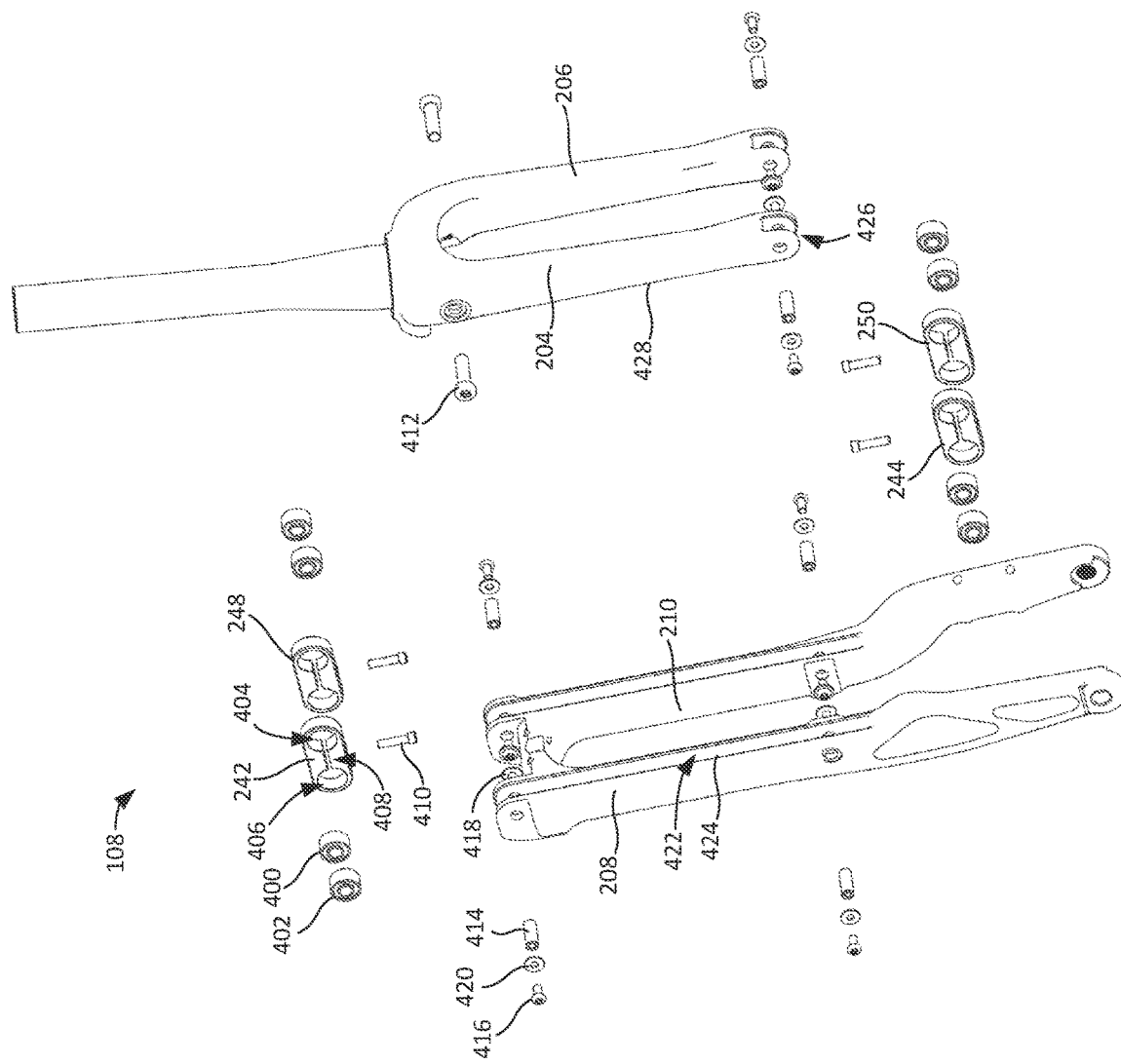
FIG. 4 is an exploded view of the example front fork of FIG. 2.

FIG. 4 is an exploded view of the example front fork 108. In the illustrated example, the front fork 108 includes a first bearing 400 that rotatably couples the first link 242 and the first leg 204 and a second bearing 402 that rotatably couples the first link 242 and the third leg 208. In this example the first and second bearings 400, 402 are ball bearings, which include inner and outer races and a set of balls or rollers between the inner and outer races. However, in other examples, the first link 242 can be rotatably coupled to the first and third legs 204, 208 via other types of bearings or attachment mechanisms (e.g., journal bearings, needle bearings, bushings, flexible connecting members, etc.). In the illustrated example, the first and second bearings 400, 402 are installed in the first link 242. For example, the first link 242 has a first opening 404 to receive the first bearing 400 and a second opening 406 to receive the second bearing 402. In the illustrated example, the first link 242 has a slot 408 between the first and second openings 404, 406. After the first and second bearings 400, 402 are installed in the first and second openings 404, 406, respectively, a pinch bolt 410 can be screwed into the first link 242 to reduce or close the slot 408, which reduces the size of the first and second openings 404, 406 to hold the first and second bearings 400, 402 snugly in the first link 242. In other examples, the first and second bearings 400, 402 can be installed in the first link 242 without a pinch bolt, such as by press fitting the first and second bearings 400, 402 into the respective openings 404, 406. The second, third, and fourth links 244, 248, 250 are identical to the first link 242 and each can include two bearings. Thus, to avoid redundancy, a description of the second, third, and fourth links 244, 248, 250 and their bearings is not repeated.

In the illustrated example of FIG. 4, the front fork 108 includes a first bearing bolt 412 to couple the first link 242 and the first leg 204. In this example, when the front fork 108 is assembled, the bearing bolt 412 extends through the first leg 204 and through the first bearing 400 (e.g., through the inner race) in the first link 242. This enables the first link 242 (via the first bearing 400) to rotate freely relative to the first leg 204. In some examples, the first bearing bolt 412 is threaded into the first leg 204. Additionally or alternatively, the first bearing bolt 412 can be threaded into a nut on the opposite side of the first leg 204. In other examples, the first link 242 can be rotatably coupled to the first leg 204 in other manners.

In the illustrated example of FIG. 4, the front fork 108 includes a pin 414 to couple the first link 242 and the third leg 208. In this example, when the front fork 108 is assembled, the pin 414 extends through the third leg 208 and through the second bearing 402 (e.g., through the inner race) in the first link 242. This enables the first link 242 (via the second bearing 402) to rotate freely relative to the third leg 208. In this example, the front fork 108 includes a second bearing bolt 416 and a third bearing bolt 418 that can be threaded into the ends of the pin 414. In some examples, one or more washers 420 can be disposed between the second and third bearing bolts 416, 418 and the third leg 208. In other examples the first link 242 can be rotatably coupled to the third leg 208 in other manners (e.g., a single bolt extending through or partially into the third leg 208 and the second bearing 402).

In the illustrated example of FIG. 4, the third leg 208 has a channel 422 formed in a forward side 424 of the third leg 208. When the front fork 108 is assembled, the first link 242 extends into the channel 422 in the forward side 424 of the third leg 208. Similarly, in the illustrated example, the first leg 204 has a channel 426 formed in a rear side 428 of the first leg 204 (only a portion of the channel 426 is visible, the channel 426 may appear similar to the channel 422). When the front fork 108 is assembled, the first link 242 extends into the channel 426 in the rear side 428 of the first leg 204. However, in other examples, the first link 242 may not extend into channels in the first and third legs 204, 208. Instead, the first link 242 can be installed on one of the sides of the first and third legs 204, 208. The second, third, and fourth links 244, 248, 250 are similarly coupled to the first, second, third, and fourth legs 204, 206, 208, 210. Thus, to avoid redundancy, a description of these connections is not repeated.

Figure 5:
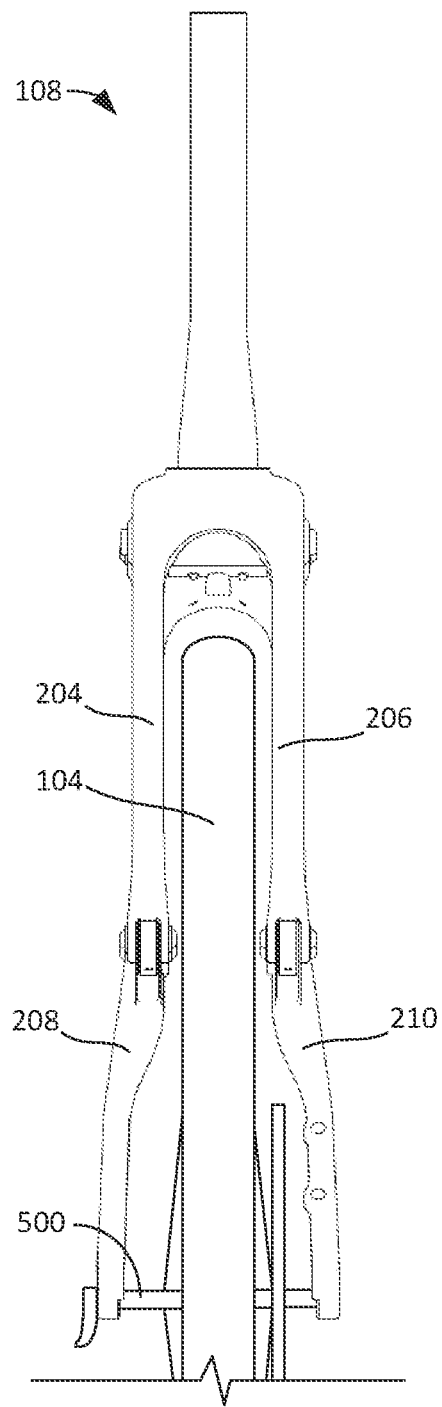
FIG. 5 is a front view of the example front fork of FIG. 2.

FIG. 5 is a front view of the example front fork 108 with the front wheel 104. The front wheel 104 has an axle 500. The ends of the axle 500 are coupled to the third and fourth legs 208, 210 at the attachment portions 232, 234 (FIG. 2). As shown in FIG. 5, as the third and fourth legs 208, 210 extend away (e.g., upward in FIG. 5) from the axle 500, the third and fourth legs 208, 210 curve inward toward the front wheel 104. Further, the first and second legs 204, 206 are aligned with the upper portions of the third and fourth legs 208, 210 and are disposed relatively close to the front wheel 104. This creates a profile that is more streamlined and aerodynamic than known telescoping tube forks. The profile of the example front fork 108 is also more aesthetically appealing because it remains aligned with the rest of the frame 102 (FIG. 1) behind the front fork 108 when viewed from the front. In known telescoping tube forks, the lower tubes extend vertically from the ends of the axle 500 and do not curve inward. As such, the tubes remain relatively wide compared to the front wheel, which results in increased drag and is less aesthetically appealing.

FIGS. 6A-6D show side views and cross-sectioned side views of the front fork 108 at different positions or states. In particular, each of FIGS. 6A-6D shows a side view of the front fork 108 in a particular position and a cross-sectional view of the front fork 108 in the same position. FIGS. 6A-6D are described in connection with the first and third legs 204, 208 and the first and second links 242, 244. It is understood that the second and fourth legs 206, 210 and the third and fourth links 248, 250 may be in the same corresponding positions. Thus, to avoid redundancy, a description of the second and fourth legs 206, 210 and the third and fourth links 248, 250 is not repeated herein. As disclosed in further detail herein, in some examples, the front fork 108 includes one or more springs or shock absorbers that help control the compression and rebound of the front fork 108.

FIG. 6A shows the front fork 108 in one example of an unloaded position, sometimes referred to as a top-out or uncompressed position. The unloaded position may correspond to the state of the front fork 108 when the bicycle 100 (FIG. 1) is on the ground without a rider (a load). While this is referred to as an unloaded position, there may be small load on the front fork 108 from the weight of the bicycle 100. As shown in FIG. 6A, the first and second links 242, 244 are angled slightly upward (e.g., non-perpendicular) from the third leg 208 of the lower fork 202 to the first leg 204 of the upper fork 200. As disclosed in further detail herein, in some examples, the front fork 108 includes one or more springs or shock absorbers. In some such examples, the spring(s) can be configured to hold the front fork 108 in this position in an unloaded state.

FIG. 6B shows the front fork 108 in one example of a loaded position. The loaded position may correspond to the state of the front fork 108 when a rider is sitting on the bicycle 100 (i.e., the front fork 108 is loaded with weight). This position is also sometimes referred to as the sag position. As shown in FIG. 6B, the first and second links 242, 244 are substantially perpendicular (e.g., ±5°) to the first and third legs 204, 208 of the upper and lower forks 200, 202. In some examples, the spring(s) are configured such that the front fork 108 is held in this position when loaded with the weight of a rider.

FIGS. 6C and 6D show a dynamic compression movement of the front fork 108 when the front wheel 104 (FIG. 1) rolls over an obstacle (e.g., a bump, a rock, etc.) or the front fork 108 is otherwise loaded or compressed. In particular, FIG. 6C shows the front fork 108 in a mid-travel position, and FIG. 6D shows the front fork 108 in a bottom-out or fully compressed position. As shown in FIGS. 6C and 6D, the first and second links 242, 244, which are rotatably coupled to the first and third legs 204, 208, enable the lower fork 202 to swing upward relative to the upper fork 200. This reduces the shocks or vibrations that are transmitted to the upper fork 200 and, thus, to the rider. After the compressive force is removed (e.g., after rolling over the obstacle), the spring(s) can bias the upper and lower forks 200, 202 in the opposite direction to return the front fork 108 to the loaded position in FIG. 6B. The range of movement of the lower fork 202 relative to the upper fork 200 is defined between the unloaded position in FIG. 6A and the bottom-out position in FIG. 6D. In some examples, the unloaded position in FIG. 6A and the bottom-out position in FIG. 6D define the physical limits of the range of movement at which two parts or components engage and prevent further movement. However, in some examples, one or more of the example springs disclosed herein are configured to top-out or bottom-out before these physical limits are reached, thereby preventing the parts or components of the font fork 108 from engaging. In some examples, even with the example spring(s), it is still possible to reach the physical limit, such as if the front fork 108 is pulled apart by an acceleration (e.g., when riding) from the front wheel 104 extending in the air after the rapid release of a compression stroke.

As shown in FIGS. 6A-6D, the links 242, 244, 248, 250 enable the lower fork 202 (and, thus, the front wheel 104 (FIG. 1)) to move in a swinging motion relative to the upper fork 200. The links 242, 244, 248, 250 are rotatable via their bearings. This configuration enables the front fork 108 to be more responsive to shocks and vibrations than known telescoping tube forks. In particular, known telescoping tube forks require a load to overcome the static friction in order to begin movement. However, the example link configuration shown in FIGS. 6A-6D has minimal, if any, static load to overcome. Thus, this configuration enables the front fork 108 to be relatively responsive, which is useful in smaller vibration applications, such as on road or hybrid bicycles.

In the illustrated example of FIGS. 6A-6D, the first and second links 242, 244 remain parallel to each other. However, in other examples, the first and second links 242, 244 can be arranged such that they are not parallel to each other.

In some examples, one or more hard stops are provided at the bottom-out position to stop the lower fork 202 from moving further upward relative to the upper fork 200. For example, referring to FIG. 6D, the first leg 204 has a first stop surface 600 and a second stop surface 602. In the position shown in FIG. 6D, the first link 242 is engaged with the first stop surface 600 and the second link 244 is engaged with the second stop surface 602. This prevents the first and second links 242, 244 from further rotating and, thus, prevents further relative movement of the upper and lower forks 200, 202. Similarly, in this example, the third leg 208 has a first stop surface 604 and a second stop surface 606. In the position shown in FIG. 6D, the first link 242 is engaged with the first stop surface 604 of the third leg 208 and the second link 244 is engaged with the second stop surface 606 of the third leg 208. These stop surfaces can be formed at any desired angle to form the bottom-out position or state. In other examples, only one of the first or third legs 204, 208 may include one or more stop surface(s).

In some examples, the first and/or third legs 204, 208 can include one or more stop surfaces to prevent movement of the lower fork 202 in the downward direction relative to the upper fork 200. For example, referring to FIG. 6D, the first leg 204 has a third stop surface 608. If the lower fork 202 was moved downward relative to the upper fork 200 too far, the first link 242 may engage the third stop surface 608, which limits movement in the downward direction. Similarly, the third leg 208 includes a third stop surface 610. In other examples, the front fork 108 may not include any stop surfaces that limit movement of the lower fork 202 in the downward direction.

As illustrated in FIG. 6D, the front fork 108 has a steering axis 612, which defines the axis about which the steerer tube 222 rotates. The lower fork 202 is curved such that the attachment portions 232, 234 (only 232 is labeled in FIG. 6A) are forward of the steering axis 612. Thus, the axle 500 (FIG. 5) of the front wheel 104 (FIG. 1) is forward of the steering axis 612. The distance between the steering axis 612 and the axle 500 of the front wheel 104 is referred to as a rake or offset. The front fork 108 can be designed to have a larger or smaller rake.

Figure 7:
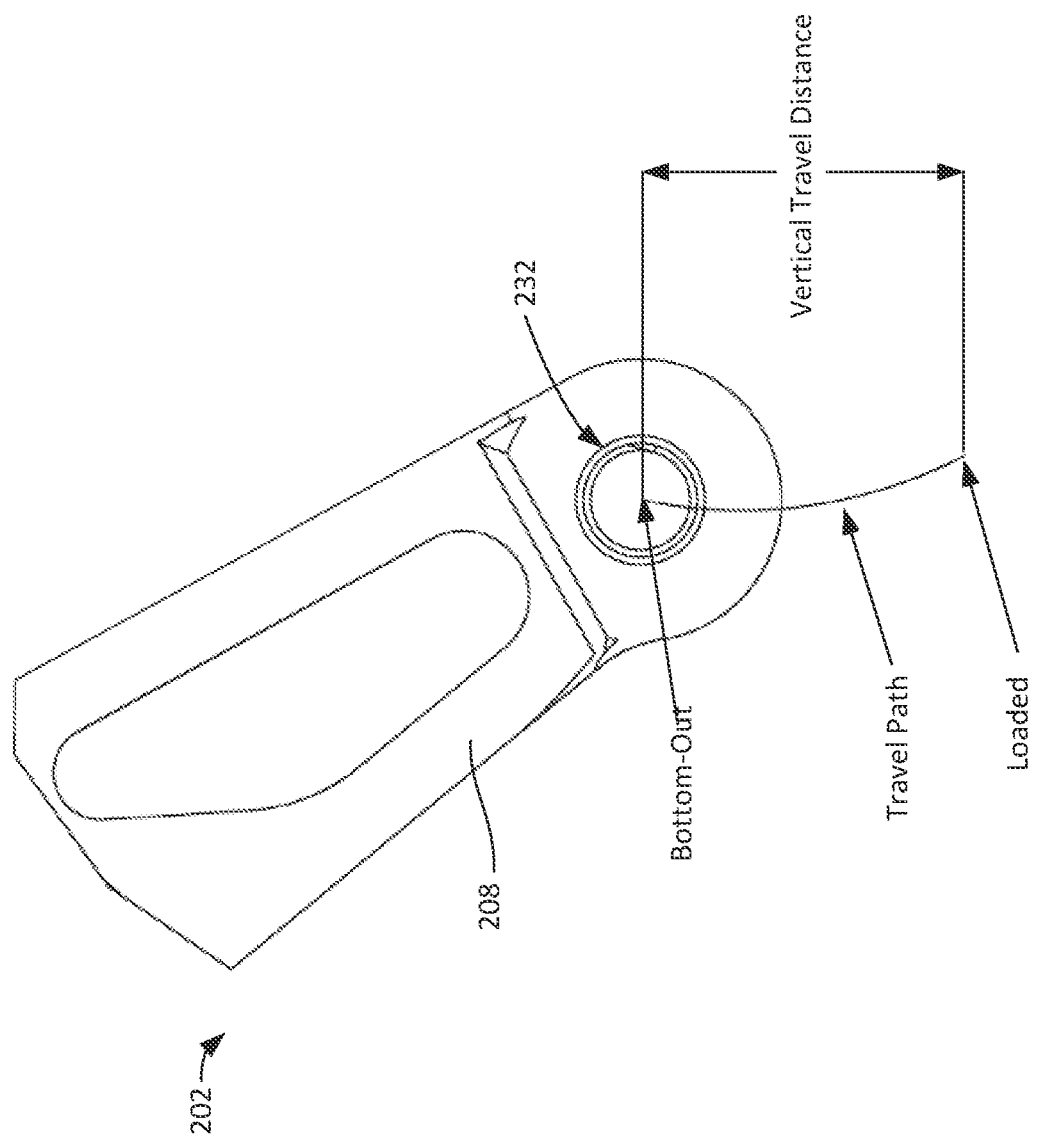
FIG. 7 shows a travel path of an example lower fork of the example front fork of FIG. 2.

FIG. 7 shows the travel path of the attachment portion 232 of the third leg 208 of the lower fork 202 between the unloaded position (FIG. 6A) and the bottom-out position (FIG. 6D). This travel path also represents the travel path of the axle 500 (FIG. 5) of the front wheel 104 (FIG. 1) and, thus, the travel path of the front wheel 104. The travel path is defined by the arrangement of the upper fork 200 (FIG. 2), the lower fork 202, and the links 242, 244, 248, 250 (FIG. 2). In this example, the travel path is a curved path, which is defined by the configuration of the legs 204, 206, 208, 210 and the links 242, 244, 248, 250. Starting at the loaded position, during compression, the third leg 208 swings upward and rearward (to the left in FIG. 7), generally toward the steering axis 612 (FIG. 6). About mid-way through the travel path, the third leg 208 continues traveling vertically, but also swings slightly forward. During rebound, the lower fork 202 moves along the travel path in the opposite direction relative to the upper fork 200. In other examples, the legs 204, 206, 208, 210 and the links 242, 244, 248, 250 can be configured to define a different shaped travel path.

The travel path (in addition to one or more spring(s) disclosed in further detail) is used to absorb energy due to rolling surface bumps or irregularities. In the illustrated example, the vertical distance of this travel path defines a vertical travel distance, which is labeled in FIG. 7. The front fork 108 can be configured to have achieve any length of travel path and/or vertical travel distance. For example, the travel path and/or the vertical travel distance can be modified by changing the length of the links 242, 244, 248, 250, the attachment points of the links 242, 244, 248, 250, the stiffness of the springs, the attachment positions of the springs, etc. These parameters can be changed to optimize the travel path and/or vertical travel distance for improved bump absorption, improved behavior braking, and/or reduced rolling resistance. In some examples, the front fork can have a travel path length of 5 mm-200 mm. Thus, in some examples, the front fork 108 can be configured for use on bicycles that only desire small or medium amounts of travel (e.g., road bikes), and can also be configured for use on bicycles that desire larger amounts of travel (e.g., mountain bikes). In other examples, the front fork 108 can be configured to have a travel path that is less than 5 mm or greater than 200 mm.

Further, the example front fork 108 can be configured to have specific ratios of travel path (shown in FIG. 7) to spring movement. Examples of springs are disclosed in further detail herein. In some examples, the ratio of the travel path to spring movement is between 0.5:1-4:1. In other examples, the ratio may be smaller than 0.5:1 or larger than 4:1.

Figure 8:
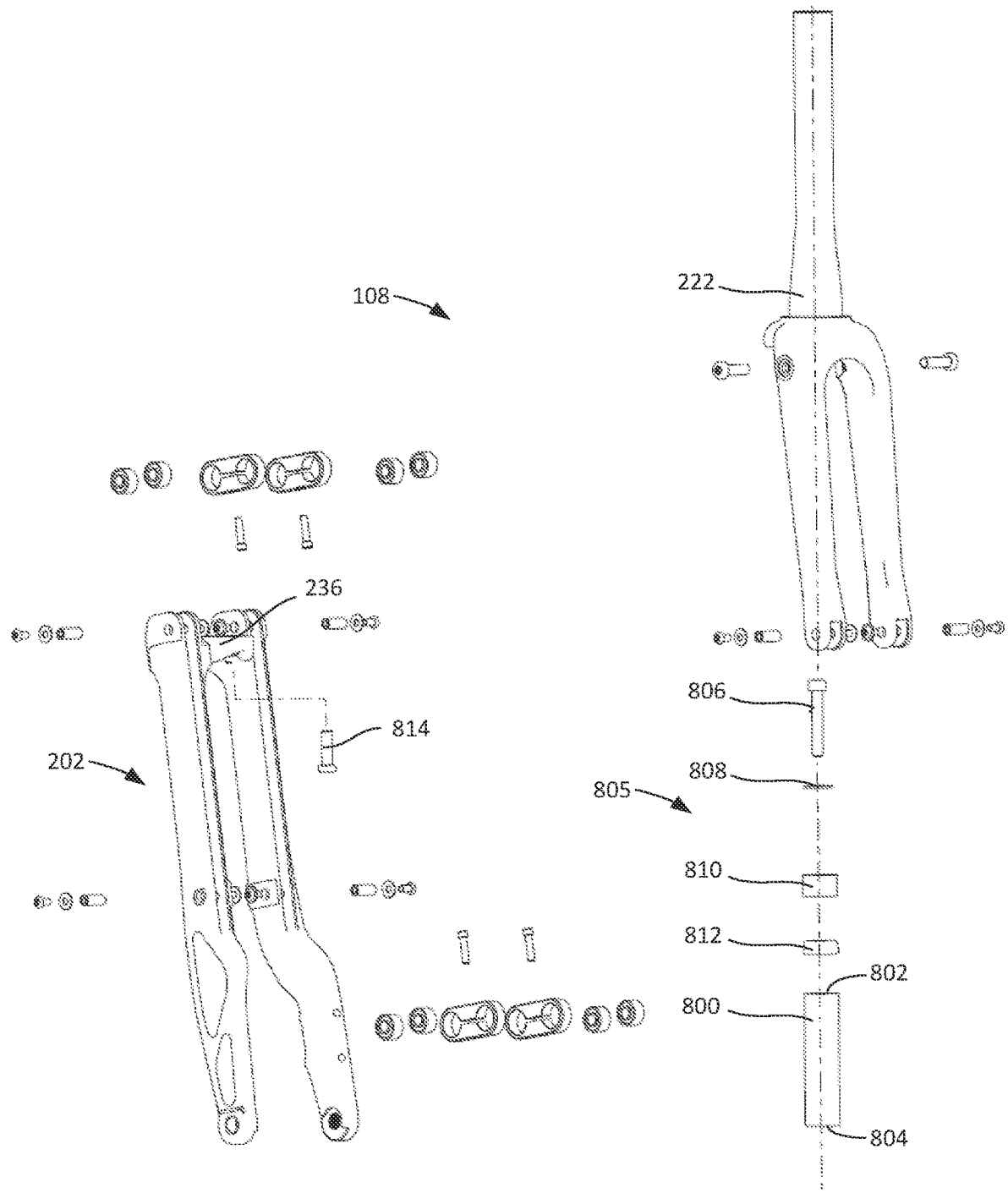
FIG. 8 is an exploded view of the example front fork of FIG. 2 including an example spring incorporated into an example steerer tube of the example front fork.

As discussed above, in some examples, the front fork 108 can include one or more springs to bias the lower fork 202 back to its original position after a dynamic compression movement and help dampen vibrations and shocks during movement of the lower fork 202 relative to the upper fork 200. FIG. 8 is an exploded view of the front fork 108 including one example of a spring 800. As disclosed in further detail, in this example, the spring 800 can be at least partially disposed in the steerer tube 222. In the illustrated example, the spring 800 is implemented as a cylindrical or tubular member constructed of a compliant material. In some examples, the compliant material includes at least one of urethane or a thermoplastic. In other examples, the spring 800 can be constructed of other types of materials (e.g., a metal material). The spring 800 has a top end 802 and a bottom end 804 opposite the top end 802.

As disclosed above, the spring 800 is to be installed in the steerer tube 222 and, when installed, is configured to bias the lower fork 202 away from the steerer tube 222 (e.g., in a downward direction). To hold the spring 800 in the steerer tube 222, the front fork 108 in this example includes a steerer stop 805. In this example the steerer stop 805 includes a top bolt 806, a washer 808, an elastomeric ring 810, and a metal taper 812. The steerer stop 805 can be installed in the steerer tube 222 to form a stop for the spring 800. When the front fork 108 is assembled, the spring 800 is partially disposed in the steerer tube 222 and extends from a bottom of the steerer tube 222. In particular, when the front fork 108 is assembled, the top end 802 is disposed in the steerer tube 222, and the bottom end 804 is engaged with the bridge 236 of the lower fork 202. In the illustrated example, the front fork 108 includes a bottom bolt 814 to couple the bottom end 804 of the spring 800 to the bridge 236.

Figure 9:
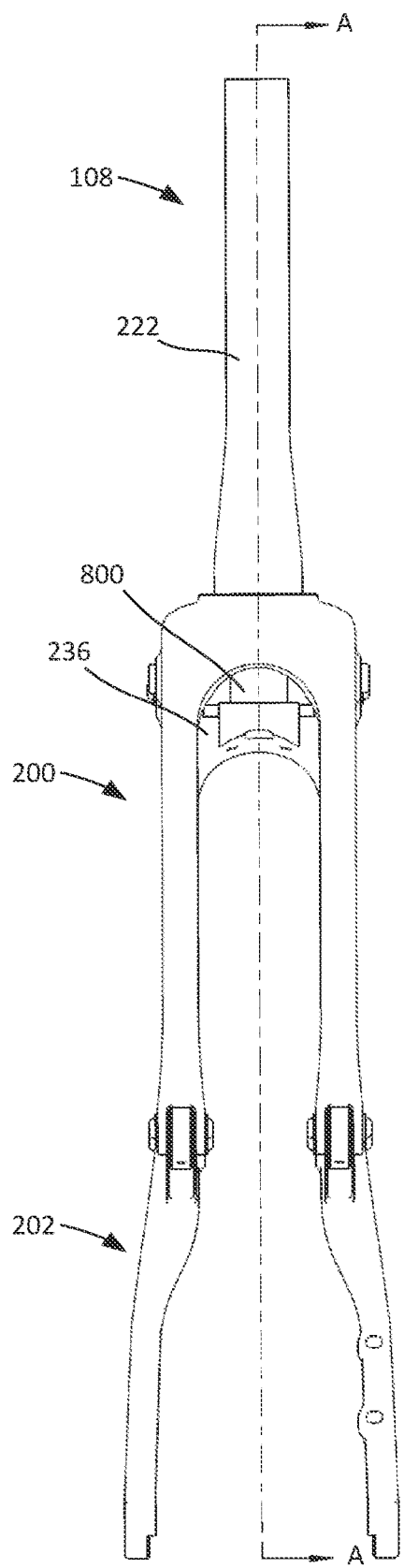
FIG. 9 is a front view of the example front fork of FIG. 8 with the example spring.

FIG. 9 is a front view of the front fork 108 with the example spring 800. As shown, the spring 800 is engaged with the bridge 236 of the lower fork 202. The spring 800 biases the lower fork 202 downward and away from the steerer tube 222. During a dynamic compression movement, the lower fork 202 is moved upward relative to the upper fork 200, which compresses the spring 800. After the load is removed, the spring 800 expands to move the lower fork 202 downward relative to the upper fork 200.

Figure 10:
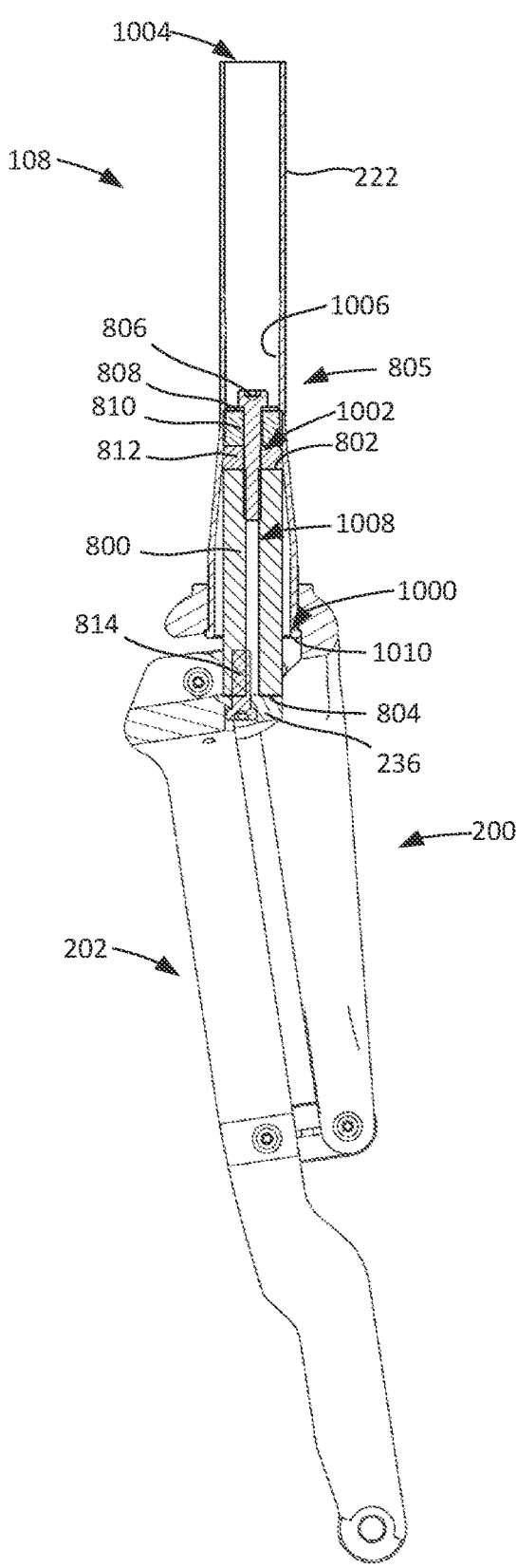
FIG. 10 is a cross-sectional view of the example front fork with the example spring of FIG. 8 taken along line A-A in FIG. 9.

FIG. 10 is a cross-sectional view of the front fork 108 taken along line A-A of FIG. 9. As shown in FIG. 10, the spring 800 is disposed in the steerer tube 222. The steerer stop 805 (including the top bolt 806, the washer 808, the elastomeric ring 810, and the metal taper 812) is locked in the steerer tube 222. In this example, steerer stop 805 couples the spring 800 to the steerer tube 222 and prevents the spring 800 from moving further up into the steerer tube 222. In the illustrated example, the spring 800 extends from a bottom opening 1000 of the steerer tube 222 and is engaged with the bridge 236 of the lower fork 202.

As an example assembly process, the top bolt 806 can be loosely inserted through the washer 808, the elastomeric ring 810, and the metal taper 812. The metal taper 812 has a threaded through-hole 1002. The outside of the metal taper 812 is angled or tapered to match an inside angle of the steerer tube 222. The steerer stop 805 (including the top bolt 806, the washer 808, the elastomeric ring 810, and the metal taper 812) is inserted into the steerer tube 222 through the bottom opening 1000. Then, a user may insert a tool (e.g., an Allen wrench, a screw driver, a socket wrench, etc.) through a top opening 1004 in the steerer tube 222 and tighten the top bolt 806 from the top. As the top bolt 806 is tightened, the elastomeric ring 810 expands against an inner surface 1006 of the steerer tube 222. Further, the metal taper 812 is pulled upward and wedged against the inner surface 1006 of the steerer tube 222, which locks the steerer stop 805 in place (e.g., via friction fit). In other examples, the steerer stop 805 can be coupled to the steerer tube 222 in other manners (e.g., via an adhesive, via a threaded fastener, etc.).

Then, the spring 800 is axially inserted into the steerer tube 222 through the bottom opening 1000. In some examples, the top end 802 of the spring 800 is coupled to the steerer stop 805. For example, the top end 802 of the spring 800 can be engaged with the metal taper 812, and the top bolt 806 extends into the top end 802 of the spring 800. In some examples, the top bolt 806 extends into a center passage 1008 in the spring 800. The interface between the threads on the top bolt 806 and the inner diameter of the spring 800 holds the spring 800 in place. In other examples, the center passage 1008 can be threaded and the top bolt 806 can be screwed into the center passage 1008 of the spring 800. Therefore, in this example, the steerer stop 805 is mechanically and/or frictionally engaged with the inner surface 1006 of the steerer tube 222 to prevent movement of the top end 802 of the spring 800 relative to the steerer tube 222. Additionally or alternatively, the top end 802 of the spring 800 can be coupled to the metal taper 812 and/or the steerer tube 222 via other mechanisms, such as bonding (e.g., an adhesive). Then, the bottom bolt 814 can be inserted through the bridge 236 and into the bottom end 804 of the spring 800. The bottom bolt 814 can extend into the center passage 1008, which can be threaded or non-threaded. Therefore, the top end 802 of the spring 800 is constrained in at least one direction by the steerer stop 805 within the steerer tube 222, and the bottom end 804 of the spring 800 is constrained in at least one direction by the bridge 236. In other examples, the spring 800 and the steerer stop 805 can be installed in other manners.

During a dynamic compression movement in which the lower fork 202 moves upward relative to the upper fork 200 (e.g., as shown in FIGS. 6C and 6D), the bridge 236 of the lower fork 202 is moved upward relative to the steerer tube 222, which compresses the spring 800 at a specific spring rate. After the load is removed, the spring 800 expands to move the lower fork 202 downward (relative to the upper fork 200) and away from the steerer tube 222, thereby expanding the front fork 108 back to the unloaded state or loaded state as shown in FIGS. 6A and 6B. The relative motion of the upper and lower forks 200, 202 can be changed for desired compression spring shock absorbing behavior. In some examples, the spring 800 can operate between compression and tension as the upper and lower forks 200, 202 are moved relative to each other. The spring 800 can be designed with different parameters (e.g., length, stiffness, etc.) to control the position of the front fork 108 in the unloaded and loaded states shown in FIGS. 6A and 6B.

In some examples, when the front fork 108 is compressed, a bottom end 1010 of the steerer tube 222 engages the bridge 236. This forms a hard stop that defines the bottom-out state in FIG. 6D. This hard stop may be implemented in addition to or as an alternative to the stop surfaces disclosed in connection with FIG. 6D. In some examples, the spring 800 may reach a fully compressed state that forms an upper limit before the bridge 236 contacts the bottom end 1010 of the steerer tube 222.

In the illustrated example of FIG. 10, the spring 800 has a smaller diameter than the bottom portion of the steerer tube 222. Therefore, at least a portion of the spring 800 in the steerer tube 222 is separated from the inner surface 1006 of the steerer tube 222. This enables the spring 800 to bend or move slightly in the steerer tube 222 during compression and expansion. Also, during a dynamic compression movement, the spring 800 expands radially outward and can fill the inside of the bottom portion of the steerer tube 222.

While in this example the spring 800 is implement as a block of compliant material, in other examples, the spring 800 can be implemented as other types of springs or shock absorbers. For example, the spring 800 can instead be implemented as a metal coil spring, a gas spring (e.g., a compressible gas chamber), a spring having a coil and/or layered construction, a leaf spring, etc.

Figure 11:
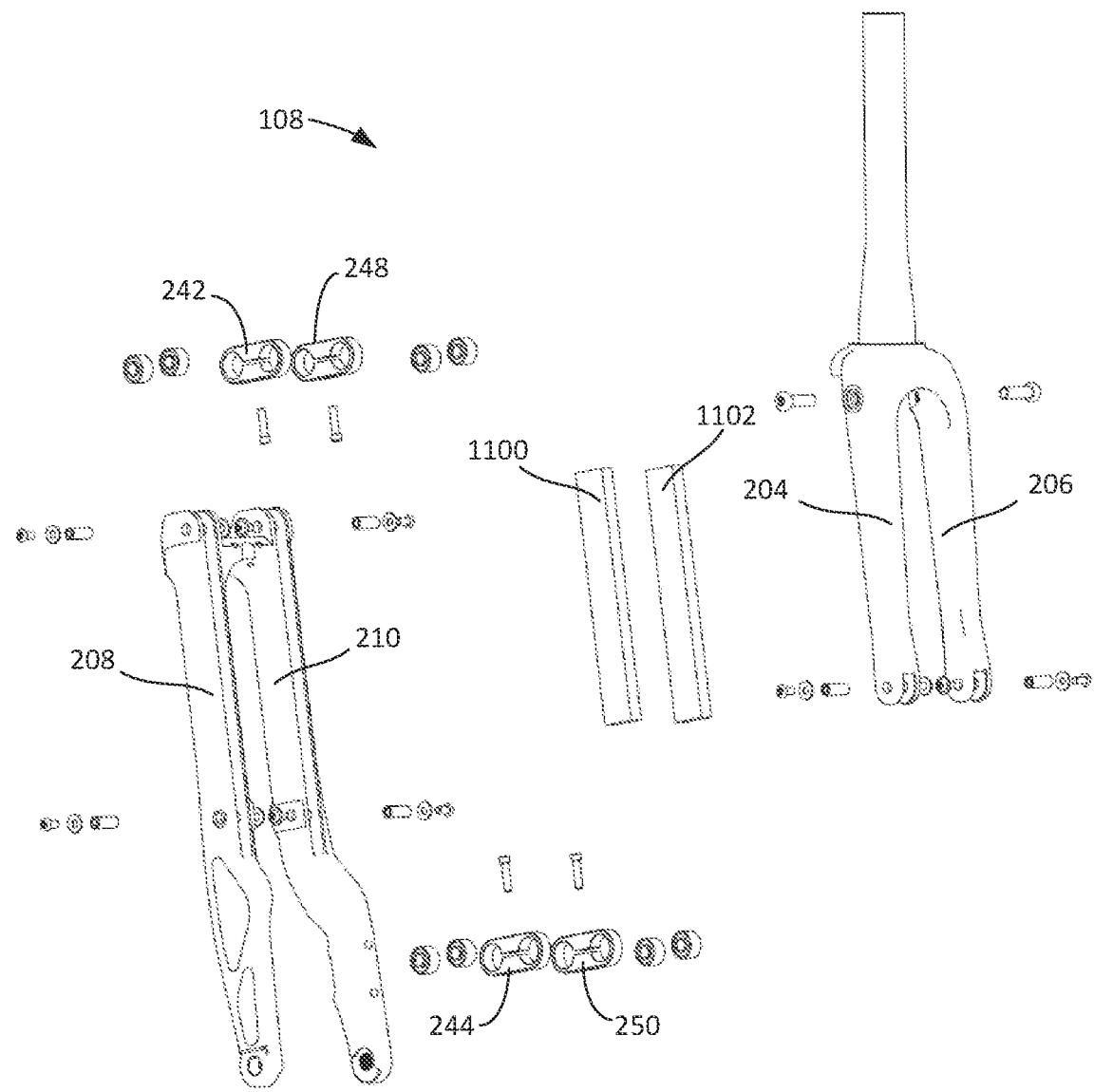
FIG. 11 is an exploded view of the example front fork of FIG. 2 including two example shear springs.

FIG. 11 is an exploded view of the front fork 108 including another example spring. In the illustrated example of FIG. 11, the front fork 108 includes a first spring 1100 and a second spring 1102. In this example, the first and second springs 1100, 1102 are shear springs, referred to hereinafter as the first shear spring 1100 and the second shear spring 1102. In the illustrated example, the first shear spring 1100 is a first block or member of a compliant material, and the second shear spring 1102 is a second block or member of the compliant material. The compliant material can be a flexible or elastomeric material. In some examples, the complaint material is ethylene propylene diene monomer (EPDM) rubber. In other examples, the first and second shear springs 1100, 1102 can be constructed of other types of materials (e.g., neoprene, urethane, thermoplastic, etc.). In the illustrated example, the first and second shear springs 1100, 1102 are cuboid shaped. However, in other examples, the first and/or second shear springs 1100, 1102 may be shaped differently, an example of which is disclosed in further detail in conjunction with FIG. 14.

When the front fork 108 is assembled, the first shear spring 1100 is disposed between the first leg 204 and the third leg 208, and is also disposed between the first link 242 and the second link 244. In some examples, the first shear spring 1100 is installed, the first shear spring 1100 is in contact with inner facing surfaces of the first leg 204, the third leg 208, the first link 242, and the second linked 244. Similarly, when the front fork 108 is assembled, the second shear spring 1102 is disposed between the second leg 206 and the fourth leg 210, and is disposed between the third link 248 and the fourth link 250. The second shear spring 1102 may be in contact with inner facing surfaces of the second leg 206, the fourth leg 210, the third link 248, and the fourth link 250. The first and second shear springs 1100, 1102 are configured to bias the lower fork 202 away from the upper fork 200. Therefore, the first and second shear spring 1100, 1102 help return the lower fork 202 to the unloaded or loaded positions after a dynamic compression movement and also help absorb shocks and vibrations.

FIG. 12 is a cross-sectional view of the front fork 108 taken along the first and third legs 204, 208 showing the first shear spring 1100. The second shear spring 1100 can be identical to the first shear spring 1100. Thus, any of the example aspects disclosed in connection with the first shear spring 1100 between the first and third legs 204, 208 can likewise apply to the second shear spring 1102 between the second and fourth legs 206, 210.

FIG. 12 shows the front fork 108 in an uncompressed state. As shown in FIG. 12, the first shear spring 1100 is disposed in the space defined between the first and third legs 204, 208 and the first and second links 242, 244. In some examples, the first shear spring 1100 is the same size as or larger than the space (e.g., the first shear spring 1100 may be in a compressed state). For example, as shown in FIG. 12, a front edge 1200 of the first shear spring 1100 is engaged with a rear facing surface 1202 of the first leg 204, and a rear edge 1204 of the first shear spring 1100 (opposite the front edge 1200) is engaged with a forward facing surface 1206 of the third leg 208. Further, a top end 1208 of the first shear spring 1100 is engaged with a downward facing surface 1210 of the first link 242, and a bottom end 1212 of the first shear spring 1100 (opposite the top end 1208) is engaged with an upward facing surface 1214 of the second link 244. Thus, in this example, the first shear spring 1100 is wedged or sandwiched between the first leg 204, the third leg 208, the first link 242, and the second link 244. However, in other examples, the first shear spring 1100 may not be in contact with all of the surfaces. In some examples, the first shear spring 1100 is held in place via friction between the first shear spring 1100, the first leg 204, the third leg 208, the first link 242, and the second link 244. Additionally or alternatively, the first shear spring 1100 can be held in place using an adhesive and/or other coupling mechanism (e.g., threaded fasteners, hook and loops fasteners, etc.).

Referring briefly to FIG. 13, FIG. 13 is a cross-sectional view of the front fork 108 taken along line B-B of FIG. 12. As shown in FIG. 13, the front edge 1200 of the first shear spring 1100 is disposed in the channel 426 formed in the rear side 428 of the first leg 204, and the rear edge 1204 of the first shear spring 1100 is disposed in the channel 422 formed in the forward side 424 of the third leg 208. This helps constrain the first shear spring 1100 and prevents the first shear spring 1100 from being removed from its position between the first and third legs 204, 208. Similarly, a front edge 1300 of the second shear spring 1102 is disposed in a channel 1302 formed in a rear side 1304 of the second leg 206, and a rear edge 1306 of the second shear spring 1102 is disposed in a channel 1308 formed in a forward side 1310 of the fourth leg 210.

Referring back to FIG. 12, during a dynamic compression movement (e.g., as shown in FIGS. 6C ad 6D), the third leg 208 is moved upward relative to the first leg 204. This cause the front edge 1200 and the rear edge 1204 of the first shear spring 1100 to be moved in a shearing or opposite direction relative to each other (e.g., forcing the first shear spring 1100 into a parallelogram shape). Further, as the third leg 208 swings through the travel path (shown in FIG. 7) toward the first leg 204, the first and third legs 204, 208 move the front and rear edges 1200, 1204 toward each other, thereby compressing the first shear spring 1100 in a compression direction. The first shear spring 1100 absorbs shocks and vibrations between the first and third legs 204, 208, as well as dampens the relative movement of the first and third legs 204, 208. The first shear spring 1100 is deformed at a specific spring rate, which produces a counter-force against the shearing and compression motion in the shearing and compression directions. Therefore, when the load is removed, this counter-force of the first shear spring 1100 expands to move the third leg 208 downward relative to the first leg 204 and away from the first leg 204, thereby moving the lower fork 202 back to the original state shown in FIG. 12. The relative motion of the upper and lower forks 200, 202 can be changed for desired shear spring absorbing behavior.

In some examples, the shape of the first shear spring 1100 dictates or controls the position of the lower fork 202 relative to the upper fork 200 in the unloaded and loaded states. For example, if the first shear spring 1100 is cuboid, as shown in FIG. 12, the shape of the first shear spring 1100 holds or biases the lower fork 202 to the position shown in FIG. 12. Therefore, in this example, the first and second shear springs 1100, 1102 are configured such that when the front fork 108 is in an unloaded state, the first and second links 242, 244 are substantially perpendicular (e.g., ±5°) to the first and third legs 204, 208 and the third and fourth links 248, 250 are substantially perpendicular to the second and fourth legs 206, 210 (similar to the position shown in FIG. 6B). When the front fork 108 is loaded, the lower fork 202 may move slightly upward relative to the upper fork 200, which forces the first shear spring 1100 into a parallelogram shape.

In other examples, the first shear spring 1100 can be shaped differently. For example, in some examples, the first shear spring 1100 can have a parallelogram-shaped cross-section. For example, FIG. 14 is a side view of another example shear spring 1400 having a parallelogram shape or profile. This shape may correspond to the shape of the space between the first leg 204, the third leg 208, the first link 242, and the second like 244 shown in FIG. 6A in the unloaded state. Then, when the front fork 108 is loaded by a rider sitting on the bicycle 100, the force moves the front fork 108 to move to the position in FIG. 6B. In this state, the shear spring 1400 may be partially loaded. Therefore, the shear spring(s) can be designed to control the positions of the front fork 108 in the loaded and unloaded states. Any shaped shear spring can be used to achieve the desired resting positions of the front fork 108.

While the spring 800 of FIGS. 8-10 and the first and second shear springs 1100, 1102 of FIGS. 11-13 can be implemented separately, in some examples, the front fork 108 can include the spring 800 of FIGS. 8-10 in combination with the first and second shear springs 1100, 1102 of FIGS. 11-13. In some examples, the combination of the spring 800 and the first and second shear springs 1100, 1102 provides enhanced damping and spring functionality. For example, the spring 800 may provide the main driving or return force, while the first and second shear springs 1100, 1102 provide damping for lower frequency vibrations. Thus, in some examples, it is advantageous to utilize the both spring configurations in combination.

While the example springs 800, 1100, 1102 are referred to herein as springs, any of the springs disclosed herein can also be referred to as dampers, spring dampers, or shock absorbers, because the example springs provide both spring functionality and damping functionality. For example, some of the example springs disclosed herein are configured to expand and move the lower fork 202 back downward after compression (i.e., provide a return biasing force), and are also configured to control the speed of movement between the upper and lower forks 200, 202. Therefore, the example springs disclosed herein can be implemented as any type of spring, damper, spring damper, and/or shock absorber. However, in some examples, the functionality can be separated, and one or more separate dampers can be utilized with the springs 800, 1100, 1102. For example, the spring 800 can be implemented as a coil around a fluid damper. In other examples, the spring 800 can be implemented as an air spring with a fluid damper portion. In yet another example, one or more flexing links could be used to provide a specific spring rate with an optional damper.

From the foregoing, it will be appreciated that example front forks have been disclosed herein that utilize unique linkage assemblies that enable the front forks to be more responsive to shocks and vibrations than known fork designs, such as telescoping front forks that require higher static friction loads to be overcome. Further, the unique linkage assemblies enable portions of the front fork to be positioned closer to the front wheel, which reduces drag and is more aesthetically appealing to riders than known telescoping front forks. Also, some example front forks disclosed herein incorporate one or more springs in certain locations that reduce(s) aerodynamic drag and do(es) not obstruct the streamline appearance of the front fork. Moreover, some example front forks disclosed herein are more optimal for medium to lower travel distance applications, such as those desired for road and hybrid bicycles that only encounter smaller shocks and vibrations.

Example front forks for bicycles have been disclosed herein. The following paragraphs provide various examples and example combinations of the examples disclosed herein.

Example 1 is a front fork for a bicycle. The front fork includes an upper fork including a first leg and a second leg, a lower fork including a third leg disposed along the first leg and a fourth leg disposed along the second leg, a first set of links rotatably coupled between the first leg and the third leg, and a second set of links rotatably coupled between the second leg and the fourth leg. The first and second sets of links are to enable the lower fork to swing relative to the upper fork. The front fork also includes a steerer tube coupled to the front fork and a spring in the steerer tube. The spring is configured to bias the lower fork away from the steer tube.

Example 2 includes the front fork of Example 1, wherein the spring is a cylindrical member constructed of a compliant material.

Example 3 includes the front fork of Example 2, wherein the compliant material includes at least one of urethane or a thermoplastic.

Example 4 includes the front fork of any of Examples 1-3, wherein the lower fork includes a bridge extending between the third leg and the fourth leg. The spring extends from a bottom opening of the steerer tube and engaged with the bridge.

Example 5 includes the front fork of Example 4, wherein the spring has a top end and a bottom end opposite the top end. The top end is disposed in the steerer tube. The bottom end is engaged with the bridge of the lower fork.

Example 6 includes the front fork of Example 5, further including a steerer stop in the steerer tube. The top end of the spring is coupled to the steerer stop in the steerer tube. The steerer stop is mechanically or frictionally engaged with an inside of the steerer tube to prevent movement of the top end of the spring relative to the steerer tube.

Example 7 includes the front fork of Example 6, wherein the steerer stop includes a first bolt extending into the top end of the spring. The front fork further includes a second bolt extending through the bridge and into the bottom end of the spring.

Example 8 includes the front fork of any of Examples 1-7, wherein at least a portion of the spring in the steerer tube is separated from an inner surface of the steerer tube.

Example 9 includes the front fork of any of Examples 1-8, further including a first shear spring disposed between the first leg and the third leg and a second shear spring disposed between the second leg and the fourth leg.

Example 10 includes the front fork of Example 9, wherein first shear spring is a first block of compliant material, and the second shear spring is a second block of compliant material.

Example 11 is a front fork for a bicycle. The front fork includes an upper fork including a first leg and a second leg and a lower fork including a third leg disposed along the first leg and a fourth leg disposed along the second leg. The lower fork is moveably coupled to the upper fork. The front fork also includes a first shear spring disposed between the first leg and the third leg and a second shear spring disposed between the second leg and the fourth leg. The first and second shear springs are configured to bias the lower fork away from the upper fork.

Example 12 includes the front fork of Example 11, wherein the first shear spring is a first block of a compliant material, and the second shear spring is a second block of the compliant material.

Example 13 includes the front fork of Example 12, wherein the compliant material is ethylene propylene diene monomer (EPDM) rubber.

Example 14 includes the front fork of Examples 12 or 13, wherein the first and second shear springs are cuboid shaped.

Example 15 includes the front fork of any of Examples 11-14, further including a first set of links coupled between the first leg and the third leg. The first set of links include a first link and a second link. The first shear spring is disposed between the first link and the second link. The front fork also includes a second set of links coupled between the second leg and the fourth leg. The second set of links include a third link and a fourth link. The second shear spring is disposed between the third links and the fourth link.

Example 16 includes the front fork of Example 15, wherein, a front edge of the first shear spring is engaged with a rear facing surface of the first leg, and a rear edge of the first shear spring is engaged with a forward facing surface of the third leg, and a front edge of the second shear spring is engaged with a rear facing surface of the second leg, and a rear edge of the second shear spring is engaged with a forward facing surface of the fourth leg.

Example 17 includes the front fork of Example 16, wherein, a top end of the first shear spring is engaged with a downward facing surface of the first link, and a bottom end of the first shear spring is engaged with an upward facing surface of the second link, and a top end of the second shear spring is engaged with a downward facing surface of the third link, and a fourth end of the second shear spring is engaged with an upward facing surface of the fourth link.

Example 18 includes the front fork of any of Examples 15-17, wherein, the front edge of the first shear spring is disposed in a channel formed in a rear side of the first leg, and the rear edge of the first shear spring is disposed in a channel formed in a forward side of the third leg, and the front edge of the second shear spring is disposed in a channel formed in a rear side of the second leg, and the rear edge of the second shear spring is disposed in a channel formed in a forward side of the fourth leg.

Example 19 includes the front fork of any of Examples 15-18, wherein the first and second shear springs are configured such that when the front fork is in an unloaded state, the first and second links are substantially perpendicular to the first and third legs and the third and fourth links are substantially perpendicular to the second and fourth legs.

Example 20 includes the front fork of any of Examples 15-19, wherein the first and second links are rotatably coupled to the first and third legs via bearings, and wherein the third and fourth links are rotatably coupled to the second and fourth legs via bearings.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A front fork for a bicycle, the front fork comprising:
an upper fork including a first leg and a second leg;
a lower fork including a third leg disposed along the first leg and a fourth leg disposed along the second leg;
a first set of links rotatably coupled between the first leg and the third leg;
a second set of links rotatably coupled between the second leg and the fourth leg, the first and second sets of links to enable the lower fork to swing relative to the upper fork;
a steerer tube coupled to the front fork; and
a spring in the steerer tube, the spring configured to bias the lower fork away from the steer tube,
wherein the lower fork includes a rotationally fixed bridge extending between the third leg and the fourth leg, the spring extending from a bottom opening of the steerer tube and engaged with the bridge.

2. The front fork of claim 1, wherein the spring is a cylindrical member constructed of a compliant material.

3. The front fork of claim 2, wherein the compliant material includes at least one of urethane or a thermoplastic.

4. The front fork of claim 1, wherein the spring has a top end and a bottom end opposite the top end, the top end disposed in the steerer tube, the bottom end engaged with the bridge of the lower fork.

5. The front fork of claim 4, further including a steerer stop in the steerer tube, the top end of the spring coupled to the steerer stop in the steerer tube, the steerer stop mechanically or frictionally engaged with an inside of the steerer tube to prevent movement of the top end of the spring relative to the steerer tube.

6. The front fork of claim 5, wherein the steerer stop includes a first bolt extending into the top end of the spring, the front fork further including a second bolt extending through the bridge and into the bottom end of the spring.

7. The front fork of claim 1, wherein at least a portion of the spring in the steerer tube is separated from an inner surface of the steerer tube.

8. The front fork of claim 1, further including:
a first shear spring disposed between the first leg and the third leg; and
a second shear spring disposed between the second leg and the fourth leg.

9. The front fork of claim 8, wherein first shear spring is a first block of compliant material, and the second shear spring is a second block of compliant material.

10. A front fork for a bicycle, the front fork comprising:
an upper fork including a first leg and a second leg;
a lower fork including a third leg disposed along the first leg and a fourth leg disposed along the second leg, the lower fork moveably coupled to the upper fork;
a first shear spring disposed between the first leg and the third leg;
a second shear spring disposed between the second leg and the fourth leg, the first and second shear springs configured to bias the lower fork away from the upper fork;
a first set of links coupled between the first leg and the third leg, the first set of links including a first link and a second link, the first shear spring disposed between the first link and the second link; and
a second set of links coupled between the second leg and the fourth leg, the second set of links including a third link and a fourth link, the second shear spring disposed between the third link and the fourth link,
wherein a top end of the first shear spring is engaged with a downward facing surface of the first link, and a bottom end of the first shear spring is engaged with an upward facing surface of the second link, and a top end of the second shear spring is engaged with a downward facing surface of the third link, and a fourth end of the second shear spring is engaged with an upward facing surface of the fourth link.

11. The front fork of claim 10, wherein the first shear spring is a first block of a compliant material, and the second shear spring is a second block of the compliant material.

12. The front fork of claim 11, wherein the compliant material is ethylene propylene diene monomer (EPDM) rubber.

13. The front fork of claim 11, wherein the first and second shear springs are cuboid shaped.

14. The front fork of claim 10, wherein,
a front edge of the first shear spring is engaged with a rear facing surface of the first leg, and a rear edge of the first shear spring is engaged with a forward facing surface of the third leg, and
a front edge of the second shear spring is engaged with a rear facing surface of the second leg, and a rear edge of the second shear spring is engaged with a forward facing surface of the fourth leg.

15. The front fork of claim 10, wherein,
the front edge of the first shear spring is disposed in a channel formed in a rear side of the first leg, and the rear edge of the first shear spring is disposed in a channel formed in a forward side of the third leg, and
the front edge of the second shear spring is disposed in a channel formed in a rear side of the second leg, and the rear edge of the second shear spring is disposed in a channel formed in a forward side of the fourth leg.

16. The front fork of claim 10, wherein the first and second shear springs are configured such that when the front fork is in an unloaded state, the first and second links are substantially perpendicular to the first and third legs and the third and fourth links are substantially perpendicular to the second and fourth legs.

17. The front fork of claim 10, wherein the first and second links are rotatably coupled to the first and third legs via bearings, and wherein the third and fourth links are rotatably coupled to the second and fourth legs via bearings.

* * * * *